(12) United States Patent
Chen et al.

(10) Patent No.: US 10,437,575 B2
(45) Date of Patent: Oct. 8, 2019

(54) AERCLOUD APPLICATION EXPRESS AND AERCLOUD APPLICATION EXPRESS LAUNCHER

(71) Applicant: Aeris Communications, Inc., Santa Clara, CA (US)

(72) Inventors: Yixiang Chen, Palo Alto, CA (US); Fumito Kayama, Pacifica, CA (US); Santosh Astagi, San Mateo, CA (US); Drew S. Johnson, San Jose, CA (US)

(73) Assignee: Aeris Communications, Inc., San Jose, CA (US)

( * ) Notice: Subject to any disclaimer, the term of this patent is extended or adjusted under 35 U.S.C. 154(b) by 0 days.

(21) Appl. No.: 15/234,493

(22) Filed: Aug. 11, 2016

(65) Prior Publication Data

US 2017/0046144 A1 Feb. 16, 2017

Related U.S. Application Data

(60) Provisional application No. 62/205,638, filed on Aug. 14, 2015.

(51) Int. Cl.
*G06F 8/60* (2018.01)
*G06F 9/455* (2018.01)
(Continued)

(52) U.S. Cl.
CPC ............ *G06F 8/60* (2013.01); *G06F 9/45558* (2013.01); *G06F 8/33* (2013.01); *G06F 8/70* (2013.01); *G06F 2009/45595* (2013.01)

(58) Field of Classification Search
CPC ..... G06F 8/33; G06F 8/60; G06F 8/70; G06F 9/45558; G06F 2009/45595
See application file for complete search history.

(56) References Cited

U.S. PATENT DOCUMENTS 6,239,707 B1 5/2001 Park
6,496,775 B2 12/2002 McDonald, Jr.
(Continued)

FOREIGN PATENT DOCUMENTS

CN 104835029 8/2015
WO 2014106299 7/2014
(Continued)

OTHER PUBLICATIONS

Wikipedia, "Virtual Machine," 2014, pp. 1-9, downloaded from the Wayback Machine Internet Archive at <url>:https://web.archive.org/web/20140402003043/https://en.wikipedia.org/wiki/Virtual_machine.*

(Continued)

*Primary Examiner* — Thuy Dao
*Assistant Examiner* — Stephen D Berman
(74) *Attorney, Agent, or Firm* — Brundidge & Stanger, P.C.

(57) ABSTRACT

A system and method in accordance with the present invention provides an enablement platform for building web-based applications for capture, analysis and use of device data using computing resources and data storage and management capabilities of hosted web services. The enablement platform works in two steps: first, for creating new instances of compute resources at a hosted service by collecting the required information and feeding it to the necessary hosted services pages; and second, for developing production-ready web-based applications for capture, analysis and use of data from M2M devices. In an embodiment, the application is used with a web-based hosted data storage, management and publication service. First step is a single page application running at a website that collects all of the required information and feeds it to the necessary hosted services pages in the background. The second step helps (Continued)

users to develop production-ready M2M applications using an Application Programming Interface (API) and easy to use software components (widgets) provided on an "out of the box" basis at the application specific user interface.

20 Claims, 18 Drawing Sheets

(51) Int. Cl.
  *G06F 8/70* (2018.01)
  *G06F 8/33* (2018.01)

(56) References Cited

U.S. PATENT DOCUMENTS

| | | |
|---|---|---|
| 6,651,001 B2 | 11/2003 | Apsell |
| 6,687,356 B1 | 2/2004 | Glitho |
| 6,931,309 B2 | 8/2005 | Phelan |
| 7,213,048 B1 | 5/2007 | Parupudi |
| 7,246,009 B2 | 7/2007 | Hamblen |
| 7,801,538 B2 | 9/2010 | Weiser |
| 7,848,765 B2 | 12/2010 | Phillips |
| 8,000,726 B2 | 8/2011 | Altman |
| 8,018,329 B2 | 9/2011 | Morgan |
| 8,135,505 B2 | 3/2012 | Vengroff |
| 8,346,230 B2 | 1/2013 | Goodman |
| 8,473,148 B2 | 6/2013 | Nielsen |
| 8,510,200 B2 | 8/2013 | Pearlman |
| 8,566,014 B1 | 10/2013 | Kozolchyk |
| 8,589,330 B2 | 11/2013 | Petersen |
| 8,593,277 B2 | 11/2013 | Nath |
| 8,595,696 B2 | 11/2013 | Maximilien et al. |
| 8,630,768 B2 | 1/2014 | McClellan |
| 8,667,456 B1* | 3/2014 | Czymontek ............ G06F 8/315 717/100 |
| 8,725,569 B2 | 5/2014 | Liang |
| 8,755,824 B1 | 6/2014 | Wang |
| 8,756,010 B2 | 6/2014 | Gupta |
| 8,869,038 B2 | 10/2014 | Eick |
| 8,909,256 B2 | 12/2014 | Fraccaroli |
| 8,913,983 B2 | 12/2014 | Lorello |
| 8,949,022 B1 | 2/2015 | Fahrner |
| 8,971,930 B2 | 3/2015 | Li |
| 9,014,888 B2 | 4/2015 | Sukkarié |
| 9,076,009 B2 | 7/2015 | Sathish |
| 9,076,165 B2 | 7/2015 | Busch |
| 9,104,738 B2 | 8/2015 | Kay et al. |
| 9,119,038 B2 | 8/2015 | Woods |
| 9,122,693 B2 | 9/2015 | Blom |
| 9,140,567 B2 | 9/2015 | Fryer |
| 9,141,266 B2 | 9/2015 | McCormick |
| 9,146,721 B1* | 9/2015 | Nagaraja ................ G06F 8/60 |
| 9,210,534 B1 | 12/2015 | Matthieu |
| 9,250,887 B2* | 2/2016 | Lucovsky ........... G06F 9/45533 |
| 9,275,114 B2 | 3/2016 | Milton |
| 9,277,362 B2 | 3/2016 | Li |
| 9,349,128 B1 | 5/2016 | Kerr |
| 9,424,751 B2 | 8/2016 | Hodges |
| 9,507,346 B1 | 11/2016 | Levinson |
| 9,576,295 B2 | 2/2017 | Volpe |
| 9,615,202 B2 | 4/2017 | Dal Santo |
| 9,661,470 B1 | 5/2017 | Du Bois |
| 9,712,486 B2 | 7/2017 | Johnson |
| 9,712,972 B2 | 7/2017 | Lynch |
| 9,741,191 B1 | 8/2017 | Wong |
| 9,774,994 B2 | 9/2017 | Chen |
| 9,792,567 B2 | 10/2017 | Khasis |
| 9,805,521 B1 | 10/2017 | Davidson |
| 9,817,948 B2 | 11/2017 | Swank |
| 9,826,345 B2 | 11/2017 | Haro |
| 9,838,843 B1 | 12/2017 | Bajaj |
| 9,871,865 B2 | 1/2018 | Shaashua |
| 9,878,663 B1 | 1/2018 | Kochura |
| 10,097,960 B2 | 10/2018 | Tung |
| 2004/0193617 A1 | 9/2004 | Adler |
| 2005/0096009 A1 | 5/2005 | Ackley |
| 2005/0156715 A1 | 7/2005 | Zou |
| 2006/0248121 A1 | 11/2006 | Cacenco et al. |
| 2007/0143013 A1 | 6/2007 | Breen |
| 2008/0125965 A1 | 5/2008 | Carani |
| 2009/0079555 A1 | 3/2009 | Aguirre De Carcerlonio |
| 2009/0019357 A1 | 11/2009 | Cudich |
| 2009/0275348 A1 | 11/2009 | Weinreich |
| 2009/0309789 A1 | 12/2009 | Verechtchiagine |
| 2010/0075648 A1 | 3/2010 | Matsuoka et al. |
| 2010/0203901 A1 | 8/2010 | Dinoff |
| 2010/0214068 A1 | 8/2010 | Nadkarni |
| 2010/0289644 A1 | 11/2010 | Slavin |
| 2010/0306735 A1 | 12/2010 | Hoff et al. |
| 2011/0112768 A1 | 5/2011 | Doyle |
| 2011/0126168 A1 | 5/2011 | Ilyayev |
| 2011/0178811 A1 | 7/2011 | Sheridan |
| 2011/0202591 A1 | 8/2011 | Reis |
| 2012/0058764 A1 | 3/2012 | Kang |
| 2012/0260228 A1* | 10/2012 | Mallick .................. G06F 8/60 717/104 |
| 2012/0330722 A1 | 12/2012 | Volpe et al. |
| 2013/0055253 A1* | 2/2013 | Jubran .................. G06F 9/455 718/1 |
| 2013/0066688 A1 | 3/2013 | Pinkus |
| 2013/0093603 A1 | 4/2013 | Tschirhart |
| 2013/0212130 A1 | 8/2013 | Rahnama |
| 2013/0254755 A1* | 9/2013 | Yousouf .................. G06F 8/60 717/170 |
| 2013/0267253 A1 | 10/2013 | Case |
| 2013/0289873 A1 | 10/2013 | Mitchell |
| 2013/0297803 A1* | 11/2013 | Hate ...................... G06F 8/60 709/226 |
| 2013/0340305 A1 | 12/2013 | Mobley |
| 2013/0346336 A1 | 12/2013 | Murphy |
| 2014/0026113 A1 | 1/2014 | Farooqi |
| 2014/0057648 A1 | 2/2014 | Lyman |
| 2014/0059695 A1 | 2/2014 | Parecki |
| 2014/0062695 A1 | 3/2014 | Rosen |
| 2014/0095214 A1 | 4/2014 | Mathe et al. |
| 2014/0155094 A1 | 6/2014 | Zises |
| 2014/0215043 A1 | 7/2014 | Ryu et al. |
| 2014/0226470 A1 | 8/2014 | Kim |
| 2014/0274115 A1 | 9/2014 | Michalson |
| 2014/0274136 A1 | 9/2014 | Edge |
| 2014/0282380 A1* | 9/2014 | Abrahams .............. G06F 8/33 717/110 |
| 2014/0325048 A1 | 10/2014 | Benchorin |
| 2014/0325394 A1 | 10/2014 | Hamill |
| 2014/0351411 A1 | 11/2014 | Woods |
| 2014/0359552 A1* | 12/2014 | Misra .................... H04L 67/12 717/100 |
| 2014/0370911 A1 | 12/2014 | Gorgenyi |
| 2014/0380264 A1 | 12/2014 | Misra et al. |
| 2015/0012908 A1 | 1/2015 | Farooqi |
| 2015/0095355 A1 | 4/2015 | Patton |
| 2015/0106206 A1 | 4/2015 | Vengroff |
| 2015/0135163 A1* | 5/2015 | Mun ...................... G06F 8/71 717/120 |
| 2015/0149980 A1* | 5/2015 | Zhong .................... G06F 8/20 717/105 |
| 2015/0163626 A1 | 6/2015 | Zimmer |
| 2015/0173037 A1 | 6/2015 | Pijl |
| 2015/0181016 A1 | 6/2015 | Jain |
| 2015/0245189 A1 | 8/2015 | Nalluri |
| 2015/0264527 A1 | 9/2015 | Wang |
| 2015/0271033 A1 | 9/2015 | Srivastava et al. |
| 2015/0278759 A1 | 10/2015 | Harris |
| 2015/0304175 A1* | 10/2015 | Maes .................... G06F 8/70 709/226 |
| 2015/0350843 A1 | 12/2015 | Jensen et al. |
| 2016/0041833 A1 | 2/2016 | Standley et al. |
| 2016/0050536 A1 | 2/2016 | You |
| 2016/0057209 A1* | 2/2016 | Parikh .................. H04L 67/10 709/203 |
| 2016/0073229 A1 | 3/2016 | Haro |
| 2016/0103657 A1 | 4/2016 | Zhang et al. |

(56) References Cited

U.S. PATENT DOCUMENTS

| | | | |
|---|---|---|---|
| 2016/0116596 A1 | 4/2016 | Rajala | |
| 2016/0124742 A1* | 5/2016 | Rangasamy | H04L 47/70 717/103 |
| 2016/0150021 A1 | 5/2016 | Britt | |
| 2016/0173404 A1* | 6/2016 | Pouyllau | G06F 17/3053 709/226 |
| 2016/0284184 A1 | 9/2016 | Bean et al. | |
| 2016/0357522 A1 | 12/2016 | Wee | |
| 2016/0371553 A1 | 12/2016 | Farnham, IV | |
| 2017/0006135 A1 | 1/2017 | Siebel | |
| 2017/0006419 A1 | 1/2017 | Rajala | |
| 2017/0006430 A1 | 1/2017 | Chao | |
| 2017/0171204 A1 | 6/2017 | Forood | |
| 2017/0203633 A1 | 7/2017 | High | |
| 2017/0270792 A1 | 9/2017 | Breton | |
| 2017/0349058 A1 | 12/2017 | Bernier | |
| 2017/0359237 A1 | 12/2017 | Hao | |
| 2018/0005522 A1 | 1/2018 | Pogula | |
| 2018/0049001 A1 | 2/2018 | Volozh | |
| 2018/0199239 A1* | 7/2018 | Sabater Maroto | G06F 9/5072 |
| 2018/0302476 A1 | 10/2018 | Perez | |
| 2018/0365785 A1 | 12/2018 | Boss | |

FOREIGN PATENT DOCUMENTS

| | | |
|---|---|---|
| WO | 2015143416 | 9/2015 |
| WO | 2016025495 | 2/2016 |

OTHER PUBLICATIONS

Wikipedia, "Virtual Machine," 2013, pp. 1-11, downloaded from the Wayback Machine Internet Archive at <url>:https://web.archive.org/web/20130402165412/https://en.wikipedia.org/wiki/Wireless_sensor_network.*

Wei-Tek Tsai et al., "Service-Oriented Cloud Computing Architecture," 2010 [retrieved on May 9, 2019], Seventh International Conference on Information Technology: New Generations, pp. 684-689, downloaded from :https://ieeexplore.ieee.org/. (Year: 2010).*

B Loganayagi et al., "Creating virtual platform for cloud computing," 2010 [retrieved on May 9, 2019], 2010 IEEE International Conference on Computational Intelligence and Computing Research, pp. 1-4, downloaded from :https://ieeexplore.ieee.org/. (Year: 2010).*

Radha Guha et al., "Impact of Web 2.0 and Cloud Computing Platform on Software Engineering," 2011 [retrieved on May 9, 2019], International Symposium on Electronic System Design, pp. 213-218, downloaded from :https://ieeexplore.ieee.org/. (Year: 2011).*

MyGeoTracking, GeoFencing & Alerts, Abaqus Inc., http://www.mygeotracking.com/solutions/pdf/geo_fencing_alerts., Jul. 11, 2016.

International Search Report and Written Opinion from International Application No. PCT/US16/46923 dated Oct. 27, 2016.

Brouwers et al., Dwelling in the canyons: Dwelling detection in Urban Environments Using GPS, Wi-Fi, and Geolocation, Dec. 14, 2011.

Boukhechba et al.,Hybrid battery-friendly mobile solution for extracting users' visited places, Dec. 31, 2016.

Perera et al., Energy Efficient Location and Activity-aware On-Demand Mobile Distributed Sensing Platform for Sensing as a Service in IoT Clouds, http://arxiv.org/abs/1601.00428, Apr. 1, 2016.

Merlino et al., Mobile crowdsensing as a service: A platform for applications on top of sensing Clouds, http://www.sciencedirect.com/science/article/pii/S0167739X15002976, Mar. 2016.

International Search Report and Written Opinion from International Application No. PCT/US16/46924 dated Oct. 28, 2016.

"GeoFencing & Alerts", myGeoTracking, Abaqus Inc., Jul. 11, 2016, 1 page, Retrieved from: http://www.mygeotracking.com/solutions/pdf/geo_fencing_alerts_pdf.

Almomani et al., "Ubiquitous GPS vehicle tracking and management system", In Applied Electrical Engineering and Computing Technologies (AEECT), Dec. 31, 2011, IEEE Jordan Conference on, pp. 1-6.

Dennis Mbuvi, "Airtel Provide Connectivity to 2nk Sacco's Frotcom Fleet Management System", Airtel, Africa News Service, Feb. 2013.

Gerla et al., "Internet of vehicles: From intelligent grid to autonomous cars and vehicular clouds", In Internet of Things (WF-IoT), 2014 IEEE World Forum on, pp. 241-246., Dec. 31, 2014.

Rusu et al., "Localization in large-scale underground environments with RFID", 24th Canadian Conference on Electrical and Computer Engineering (CCECE), May 31, 2011.

Jin et al., "An information framework for creating a smart city through internet of things", IEEE Internet of Things Journal, 1(2), pp. 112-121, Dec. 31, 2014.

Gantait et al., Use vehicle sensor data to execute smart transactions in Blockchain, IBM, Jun. 5, 2017., Retrieved from Internet: https://www.ibm.com/developerworks/cloud/library/cl-blockchain-for-cognitive-iot-apps2/.

Adelabu, Design and Construction of a Vehicle Tracking and Accident Alert System Using GPS and GSM Module, Nov. 30, 2017., Retrieved from the Internet: http://repository.fuoye.edu.ng/bitstream/123456789/1441/1/DESIGN%20AND%20CONSTRUCTION%20%20OF%20A%20VEHICLE%20TRACKING%20AND%20ACCIDENT%20ALERT%20SYSTEM%20%20USING%20%20GPS%20%20AND%20GSM%20MODULE.pdf. (C) Nov. 2017.

AT&T, Fleet management and tracking, Feb. 26, 2018., Retrieved from the Internet: https://www.business.att.com/solutions/Service/internet-of-things/vehicle-solutions/iot-connected-fleet/. (C)2018. Earliest publication date via Wayback archive:http://web.archive.org/web/20180226093503/https://www.business.att.com/solutions/Service/internet-of-things/vehicle-solutions/iot-connected-fleet/.

Frey, IoT ushers in a new era for supply chain fulfillment, Oct. 25, 2017, Retrieved from the Internet: https://internetofthingsagenda.techtarget.com/blog/IoT-Agenda/IoT-ushers-in-a-new-era-for-supply-chain-fulfillment.

International Search Report and Written Opinion from International Application No. PCTUS1838825 dated Sep. 18, 2018.

Wei-Tek Tsai et al., "Service-Oriented Cloud Computing Architecture, "2010 [retrieved on May 9, 2019], Seventh International Conference on Information Technology: New Generations, pp. 684-689, downloaded from: https://eeexplore.ieee.org/.2010.

B Loganayagi et al., "Creating Virtual Platform for Cloud Computing, "2010 [retrieved on May 9, 2019], 2010 IEEE International Conference on Computational Intelligence and Computing Research, pp. 1-4, downloaded from: https://eeexplore.ieee.org 2010.

Radha Guha et al, "Impact of Web 2.0 and Cloud Computing Platform on Software Engineering, "2011 [retrieved on May 9, 2019], International Symposium on Electronic System Design, pp. 213-218, downloaded from: https//ieeexplore.ieee.brg 2011.

* cited by examiner

Configuration App Call Flow

Live Map App Call Flow

Device Detail App Call Flow

Device Entry App Call Flow

Chart App Call Flow

AERCLOUD APPLICATION EXPRESS AND AERCLOUD APPLICATION EXPRESS LAUNCHER

CROSS-REFERENCE TO RELATED APPLICATION

This application claims priority to U.S. Provisional Application No. 62/205,638 filed Aug. 14, 2015, which is incorporated herein by reference in its entirety; and is related to U.S. patent application Ser. No. 15/234,463, filed on Aug. 11, 2016, entitled "SYSTEM AND METHOD FOR MONITORING DEVICES RELATIVE TO A USER DEFINED GEOGRAPHIC AREA" which is incorporated herein by reference in its entirety,

FIELD OF THE INVENTION

The present invention relates generally to providing an enablement platform for building web-based applications for capture, analysis and use of device data using computing resources and data storage and management capabilities of hosted web services.

BACKGROUND

With the explosion of the Internet of Things (IoT) and the number of devices connected over internet and wireless communications and generating data for use in user-defined applications, it has become more and more important to enable users to easily build web-based applications that allow analysis and use of this generated data for meaningful purposes, such as real time monitoring of and interaction with Machine to Machine (M2M) devices and services within a communication infrastructure.

To make use of this generated data, a user needs easily-accessed computing resources that are powerful enough to build sophisticated applications for analyzing data, and needs to configure those applications to work with the user's preferred data storage, management and publication solutions, whether private or hosted by third parties, so that the user can capture data received wirelessly from M2M devices, analyze the data and create and publish meaningful actions based on the results of that analysis. The present invention addresses such a need.

SUMMARY

A system and method in accordance with the present invention provides a web-based enablement platform consisting of a launcher for creation of virtual compute resources and a pre-loaded suite of tools for building applications that interact with data storage, management and publication capabilities of one or more hosted web services.

The enablement platform works in two steps. First, the user is able to create a web-based "instance" of a compute resource that is pre-loaded with a suite of tools for building applications for analysis of and creation of meaningful actions based on data received wirelessly from M2M devices and stored in the user's data storage service, which may be a private or hosted web-based service. The user is then prompted through the steps for using the tools to create sophisticated applications that access and analyze the stored M2M data and to create alerts and actions based on the results of the analysis, and then to publish those alerts and actions to the specified stakeholders. While it is possible for a user to interact with a number of different web-based services to access compute resources, such as the Elastic Compute Cloud (EC2) service from Amazon Web Services, that supply the logic for creating applications, to then create applications for analyzing and generating actions based on data, to enable those applications to access data stored in hosted data storage and management services (such as the Simple Storage Service (S3) from Amazon Web Services) in order to perform analytics on that data using compute resources located in the hosted service or elsewhere, and to generate meaningful actions based on the results of that analysis and publish the actions to the correct stakeholders, doing so is cumbersome, frustrating and error-prone.

The present invention solves this problem by creating a platform that allows the user, in a single visit, to create an instance of compute resources and to build applications, using provided tools, for analysis of M2M device data that has been received in the user's account with a hosted web services for data storage, management and publication, and for creation and publication of alerts and actions based on a result of that analysis. The enablement platform in accordance with the present invention allows a user to do all of the foregoing by interacting with a single page that collects required information, feeds it to the appropriate fields in the pages of the virtual compute resource hosted service, and returns confirmation that a virtual instance of the compute resource has been created.

The platform then simplifies the development of production-ready M2M applications through embedded functionality provided with the compute resource instance, such as third-party mapping functions brought in from other hosted services, widgets for defining groups of devices and the types of data to be collected from those devices, widgets for defining actions, such as alerts, that can be taken based on device activity data relative to user-defined parameters such as location, and access to the user's account at the hosted data storage and management service so that the service can be properly configured to work with the application. The user does not need to visit multiple websites (such as to create the AWS EC2 instance, to configure and specify data containers associated with the user's AWS S3 or similar account, or to find and license a mapping application).

1. Creating a new compute resource instance. In an embodiment, an application, hereinafter referred to as Aer-Cloud Application Express (AAE) Launcher, is used to create a new "instance" at a web-based hosted service for compute resources, such as the EC2 service from AWS or a similar service. This is a simple application running at a website that creates a new compute resource "instance" by collecting all of the required information from the user (or from information previously provided by the user in connection with creating an account at the website), feeding it to the necessary fields and pages of the compute resource hosted service in the background, and returning confirmation of creation of the instance, without ever requiring the user to leave the AAE Launcher page, simplifying the process for setting up a new instance and reducing the risk that the user would lose track of what they are doing, fail to enter the correct information at the correct place, or quit the process out of frustration.

2. Rapid development of production-ready M2M Applications. In an embodiment, the instance created using the AAE Launcher is pre-loaded with an application, hereinafter referred to as AerCloud Application Express (AAE), which can be used to create new applications for use of data from M2M devices. The AAE application runs at the compute resource service website using a simple interface (the Aer-Cloud Application Express User Interface, or AAE UI) to help users develop production-ready M2M applications using easy-to-use software tools (widgets), which may include sophisticated tools based on third-party services, such as web-based mapping services, on an "out of the box" basis and an Application Programming Interface (API) that interacts with the compute resource instance as well as the user's account with a hosted data storage and management service where M2M device data is received and stored. The user is not required to visit the websites for each tool or service or to acquire or implement the APIs needed to use the tool and to interact with the compute resource and data storage services; all of that is provided for the user.

DETAILED DESCRIPTION

Figure 1:
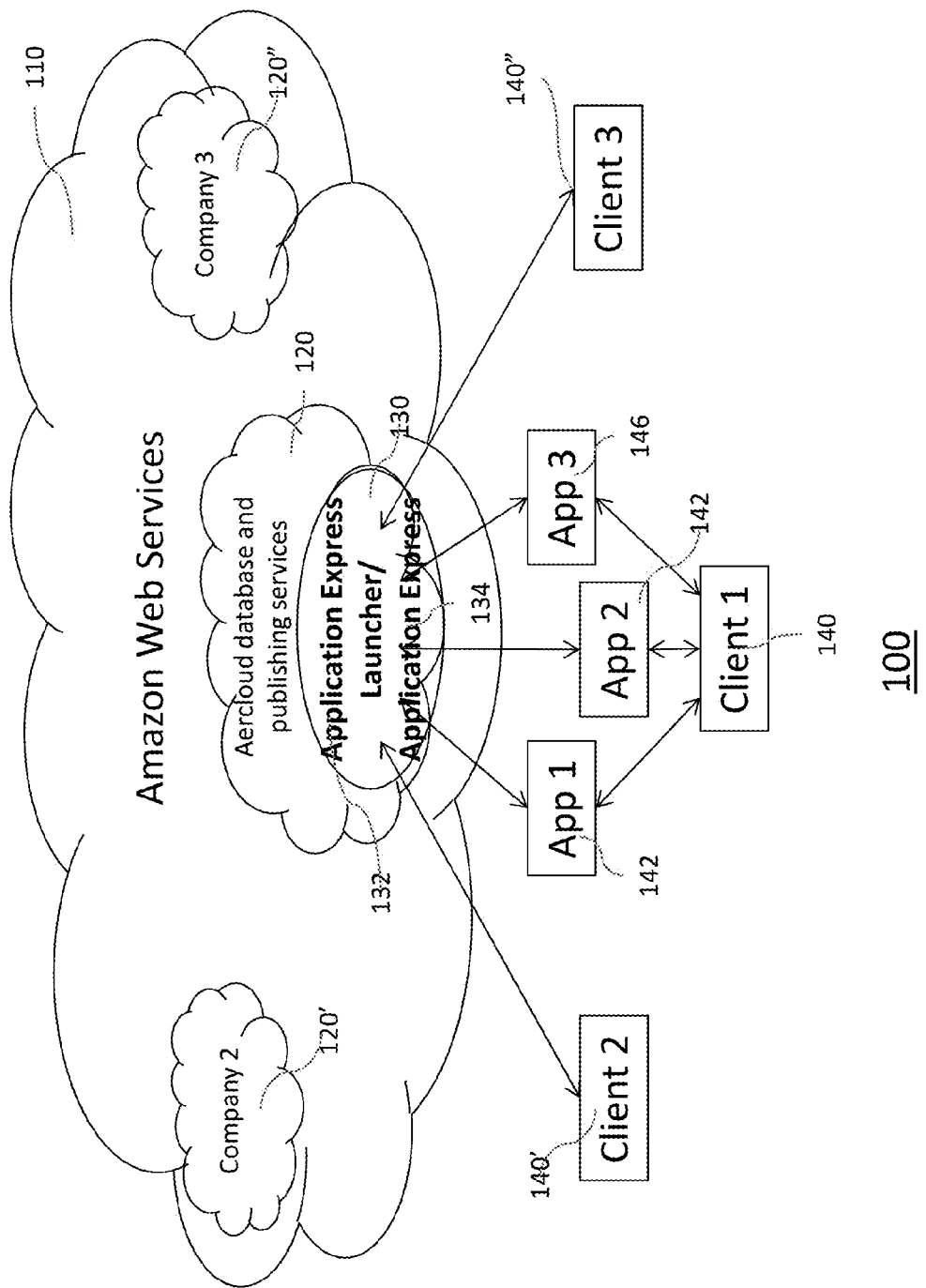
FIG. 1 illustrates an overview of an overview of a system comprising an enablement platform for development of instances at a web-based hosted compute resource service and for creation of applications, using tools provided with the instance at the hosted compute resource service, for analysis of data received by and stored at hosted data storage and management services and the creation of meaningful alerts and actions based on that analysis according to an embodiment of the present invention.

The present invention relates generally to providing an enablement platform for building web-based applications for analysis of and setting of actions based on data using compute resources and data storage and management capabilities of hosted web services and tools loaded within the hosted compute resources.

The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Although the invention is described with respect to building web-based applications using compute resources and data storage, management and publication capabilities of one or more hosted web services and tools loaded within the hosted compute resources, as used herein the term "enablement platform" is intended to be inclusive, interchangeable, and/or synonymous with other similar applications that enable creation of an instance for application development and development of an application as described further below, though one will recognize that functionally different types of applications may have characteristics, functions and/or operations which may be specific to their individual capabilities and/or deployment.

Machine to machine (M2M) network communications involve technologies optimized for communication between devices of (typically) similar abilities. In basic M2M environments, a device having limited logic (such as a sensor, meter, etc.) and limited resources (such as computing power) is resident at a location or on a mobile machine to perform such functions as capturing measurable event data (such as temperature, pressure, quantity, speed, etc.). The device is connected through a communications network, which can be WiFi, cellular or other wired or wireless networks, to a remote computer or server having an application layer of specific software. The data received from the device is converted to relevant information associated with the measured event data through the application and may often thereafter undergo analysis or further similar assessment, such as for determining whether alerts or actions should be sent or taken. In some cases a device, when activated, may have sufficient onboard application logic to process the generated data and determine whether certain parameters triggering an action have been met and, if so, communicate the events to a pre-determined list of recipients so that those communicated events will then be acted upon by other machines, applications, and/or users on the network. In other cases, the logic for processing the data is not onboard the device, but the remote computer or server that receives the data can process the received data using an appropriate application and determine whether a trigger event has occurred, and, if it has, communicate the event in a similar manner.

M2M environments often involve systems of networks, wired and wireless, that are to be connected to the internet and include industrial or personal devices. In M2M networks, devices may stationary or mobile and be connected via wired or wireless access protocols, often through WiFi network protocols or a 3GPP Mobile network protocol. These devices may also have seasonal and/or elastic connectivity needs (e.g., agricultural business needs, store and forward capability). Often in busy M2M networks, there is an 'always on' device being used such as a general packet radio services (GPRS) or internet gateway. However, M2M communication infrastructure remains most suited to the communication needs and patterns of devices having similar abilities, characteristically, for communicating with other systems and devices on the same network to allow users to monitor and manage systems. One of the ways to achieve this at a low cost is to exclude from the device processor the application logic for analyzing generated data and determining whether triggering events have occurred and instead to build easy-to-access applications (such as via the web) for collecting data from those devices, analyzing the data and publishing the data or taking other actions based on the results of the analysis using a web service that offers cloud-based and hosted data storage, management and publication solutions. Web applications typically contain a number of interconnected logical levels. For example, in a common three level structure, the first level is the web browser, which is responsible for presenting the user interface, the middle level is an application server, which is responsible for the application's functionality, and the third level is a database server or file system, which is responsible for data storage and publication.

To build web-based applications for analysis of M2M data, a user needs access to sufficient compute logic for accessing and using the various tools for selecting devices, configuring device details, specifying the analytics to be applied, creating alerts or other actions to be taken based on the results of the analysis and creating interactions with the user's data storage and management account and resources with a private or hosted web services such as the Simple Storage Service (S3) from Amazon Web Services (AWS). Third party services, such as the Elastic Compute Cloud (EC2) service from AWS, offer virtual hosted compute resources; to use these resources, users need to create new "instances" at the hosted service, and then load the logic for the application development to be performed within the instance. The typical process for creating a new instance and then using application development tools requires a user to visit many pages at different websites and interact with many different instructions. This might be acceptable for users who have set up their own EC2 or similar accounts, have access to development tools, and are familiar with the user interface, but is an impediment for companies that do not have personnel with the requisite technical qualifications or that are offering services built on AWS to customers to build their own web applications who may not have that familiarity.

The present invention provides an enablement platform for building web-based applications using compute resources with a pre-loaded suite of tools for building applications that interact with data storage, management and publication capabilities of hosted web services. As described in further detail below, the enablement platform works in two steps: First, the enablement platform in accordance with the present invention, AerCloud Application Express (AAE) Launcher, allows the user, by interacting with a single page that collects the required information and feeds it to the appropriate fields in the hosted services pages, to create a web-based "instance" of a compute resource that is pre-loaded with a suite of tools for building applications for analysis of and creation of meaningful actions based on data received wirelessly from M2M devices and stored in the user's data storage service, which may be a private or hosted web-based service. The platform then simplifies the development of "out of the box" production-ready M2M applications through functionality provided within the new instance, which can be accessed from the enablement platform. AerCloud Application Express (AAE), through its simple user interface, simplifies application development by providing tools, such as third-party mapping functions brought in from other hosted services, widgets for defining groups of devices and the types of data to be collected from those devices, widgets for defining actions, such as alerts, that can be taken based on device activity data relative to user-defined parameters, such as location, and Application Programming Interfaces (APIs) that allow simple interaction between the application and the data storage service to create the desired functionality. Detailed examples of certain embodiments of each of these steps are described below. The embodiments described below, however, are merely examples used for purpose of illustration only, and should not be construed as limitations.

1. Creating a new compute resource instance. AerCloud Application Express (AAE) Launcher, which is designed for use with the Aeris AerCloud service for receiving, storing, managing and publishing data received from M2M devices, allows the user to set up new compute resource instances by collecting the required information from the user (or from information previously provided by the user in connection with creating an account at the website) and feeding it to the necessary fields and pages of the compute resource hosted service in the background, and returning confirmation of creation of the instance, without ever requiring the user to leave the AAE Launcher page, simplifying the process for setting up a new instance and reducing the risk that the user would lose track of what they are doing, fail to enter the correct information at the correct place, or quit the process out of frustration.

AAE Launcher contemplates initial setup and management of a master account (such as an enterprise) and subaccounts (such as for customers). The master account would have an administrative user for that account who can both create AAE instances for the company master account and also create subaccounts for other users (such as customers) who can then create their own AAE instances for that second user's account. Once created in AAE Launcher, the instances would then give users access to the pre-loaded application development tools provided through AAE as well as tools for either managing the interface between the applications and the AerCloud service or, if users wish to download the application to use with their own hosting environment, instead of AerCloud, to an appropriate service.

AAE Launcher consists of a highly user-friendly user interface (UI) for creating new compute resource instances as well as for managing and searching existing instances associated with a user's account. According to one embodiment described herein, the UI walks the user step-by-step through the process of creating a new instance and of managing existing instances. For example, according to one such embodiment illustrated in the figures (e.g., FIGS. 3 and 4) and described below, the step-by-step process includes:
 a. Create an AAE instance by only two steps:
  i. Entering a name in the input,
  ii. Clicking the LAUNCH button.
 b. Download the latest package containing Web application ARchive (WAR) file in case the user wants to install the application into their own hosting environment instead of running the application from AerCloud.
 c. Launch the AAE user guide from the link provided.
 d. See all existing AAE instances associated with the account.
 e. Search all existing AAE instances associated with the account.
 f. Refresh search criteria with new criteria for a search.
 g. See names of the AAE instances.
 h. See ID of newly created instances.
 i. See state of AAE instances.
 j. See system status of newly created instances.
 k. See instance status of newly created instances.
 l. See if the existing AAE instances are ready to use.
 m. See private and public IP addresses of the existing AAE instances.
 n. See URL of the AAE instances.
 o. Select and launch selected AAE instance in a new browser window.
 p. Reboot an existing AAE instance.
 q. Terminate an existing AAE instance.
 r. Launch a repository for the source code and checkout the project.
 2. Rapid development of production-ready M2M Applications. In an embodiment, an application, hereinafter referred to as AerCloud Application Express (AAE), is used to develop production-ready M2M applications using AerCloud Application Programming Interface (API) and widgets provided on an "out of the box" basis at AerCloud Application Express User Interface (AAE UI). Once the user has used AAE Launcher to create a new compute resource instance, the user is able to quickly develop production-ready M2M applications using AerCloud API and widgets provided on an "out of the box" basis at the AAE UI. The developed applications are designed for use with the Aeris AerCloud data storage, management and publication service, but can also be downloaded to a hosted service chosen by the user.

For example, according to one embodiment illustrated in the figures (e.g., FIGS. 5a through 9b) and described below, the step-by-step process for creating applications using AAE may include the following:
 a. System Configuration page that invites users to begin creation of applications, first by entering their user credentials for their AerCloud account such as account ID and API key and, if applicable, a key for incorporating other applications, such as a mapping program, into the applications to be developed that incorporate that other application. Upon a valid combination of the AerCloud credentials, the user specifies which data will be processed using the application under development. The user is permitted to select an existing data container (which is a specific data storage entity configured by the user within AerCloud for receipt of data from M2M devices) under the account and, using advanced options, is permitted to update other data, such as the default AerCloud Web Service URL and default AerCloud Long Poll URL.
 b. An example of one tool for creating applications using the claimed invention is the Live Map application, which allows users to create applications that allow tracking of devices under the selected container and their activity relative to a geographic area using commercially available mapping products such as Mapquest. The user is permitted to create "geofences" under the selected container, which are alerts that send notifications when devices have, for example, entered a user-defined geographic area, left that area, or engaged in (or failed to engage in) certain behavior while located within that area. The invention simplifies the method provided by Mapquest for defining the boundaries of the geofence by using the drawing tool provided within the development tool and provides superior flexibility for setting alerts based on device behavior (such as which devices inside the geofence are behaving outside permitted parameters). For example, according to one embodiment illustrated in the figures (e.g., FIGS. 6a through 9b) and described below, the step-by-step process to create and use the Live Map application include:
  i. In the left tab in the left panel, the user is permitted to:
   1. See all of their devices under the selected container that have been associated with the application.
   2. See all of their groups that have been created using "Device Entry" and devices associated to the group.
   3. See all of their devices under the selected container that are in alert status (see (ii) below for an example process for defining alerts).
   4. Select all of their devices, groups of devices or individual device to display as a marker on the map.
  ii. In the right tab in the left panel, the user is permitted to:
   1. Create a new alert.
   2. See all the existing alerts.
   3. See the detail of the alert in a draggable overlay widget.
  iii. In the draggable overlay widget (see, e.g., 4-b-ii-3 below), the user is permitted to:
   1. Enter criteria for a new alert.
   2. Update the selected alert.
   3. Delete the selected alert.
   4. Enter name of the alert.
   5. Select a shape for geo-fence.
   6. Click the Add button in the select a geo-fence shape view to enable geo-fence drawing mode using the simplified tool.
   7. See an instruction of what to do while in the geo-fence mode in a green popup. i.e. "Click and drag the mouse on the map to draw a circle".
   8. Remove the geo-fence just drawn.
   9. Set whether the alert should be executed when the device is inside of the geo-fence or outside of the geo-fence.

10. Set a condition with parameters retrieved from AerCloud.
11. Create an existing condition using an inline navigation bar.
12. Delete an existing condition an inline navigation bar.

iv. "Create detail link" in the bottom of the left pane:
1. The section, for example, stays at the same position (bottom of the left panel) in the map.
2. Clicking the link generate an overlay widget where the user is permitted to:
   a. Enter the name of device detail page app that generate a link to the device detail page from the live map page when clicking the device ID in the left tab in the left panel.
   b. Update the device detail page name.
   c. Empty the device detail page name which removes a link to the device detail page from the device ID in the left tab in the left panel.

v. Clicking the icon on the left panel next to the two tabs opens and closes the left panel.
vi. When the user checks "Show all assets", a group or individual device checkbox, the user is permitted to see the current location of the device on the map.
vii. When the user moves mouse over a marker on the map, the info of the marker shows up in a popup window above the marker.
viii. If the marker on the map is in the alert status, color of the marker is red.
ix. Likewise, if the marker on the map is not in the alert status, color of the marker is light green.
x. If the marker is on the map and an existing alert with geo-fence is selected in the right tab in the left panel, the user is able to see if the marker is inside/outside of geo-fence on the map.

c. Device Detail app:
i. When the user selects a device from the dropdown at the top, s/he is permitted to view the custom device attribute, device info and a group in the accordion in the top left section.
ii. The user is permitted to also see history of the locations for the selected device in the top right section. If the user moves mouse over the marker on the map, the user is permitted to see the info of the device.
iii. The user is permitted to also see history of the raw data for the selected device in a time series data table. The first column of the table is, for example, creation time and sorted by the most recent data sent from the device.
iv. If the user has saved the detail page name using "Create detail link" in the Live Map app (see, e.g., b-iv above), the user is permitted to launch the Device Detail app from the Live Map app and the device in the dropdown is pre-selected in the Device Detail page.
v. When the user mouse-overs on a marker on map or device, the user is permitted to view the details of the device.

d. Device Entry app:
i. When the user selects a device from the dropdown, s/he is permitted to:
1. See all the existing custom device attribute and device information.
2. Create a new custom device attribute and device information using an inline navigation bar.
3. Update the existing custom device attribute and device information using an inline navigation bar.
4. Create a new group by clicking the Create new group link which generates an overlay widget.
5. Associate a group for the selected device by selecting a group from the dropdown in the group section.
6. Disassociate a group from the selected device by selecting "--Select Group--" from the dropdown in the group section.
7. Delete an existing group by the Delete [group name] link.

e. Chart app:
i. The user is permitted to generate a time-series chart by selecting device, data field and chart type.

To describe the features of the present invention in more detail within the context of the Live Map application, which allows users to create applications for tracking of devices and their activity relative to a geographic area using commercially available mapping products such as Mapquest, refer to the accompanying figures in conjunction with the following discussions. These examples are used for purpose of illustration only, and should not be construed as limitations.

FIG. 1 illustrates an overview of a system 100 comprising an enablement platform for development of web applications using hosted web services for compute resources and data storage, management and publication according to an embodiment of the present invention. As illustrated in FIG. 1, hosted web service such as the S3 service from AWS 110 is used as part of the AerCloud service for providing data storage, management and publication capabilities 120. The AerCloud database and publishing services 120 provides an enablement platform 130 containing Application Express Launcher 132/Application Express 134 for its clients client1 140, client2 140' and client3 140" to access web-based compute resources and build their own web-based applications App1 142, App2 144 and App3 146.

Figure 2:
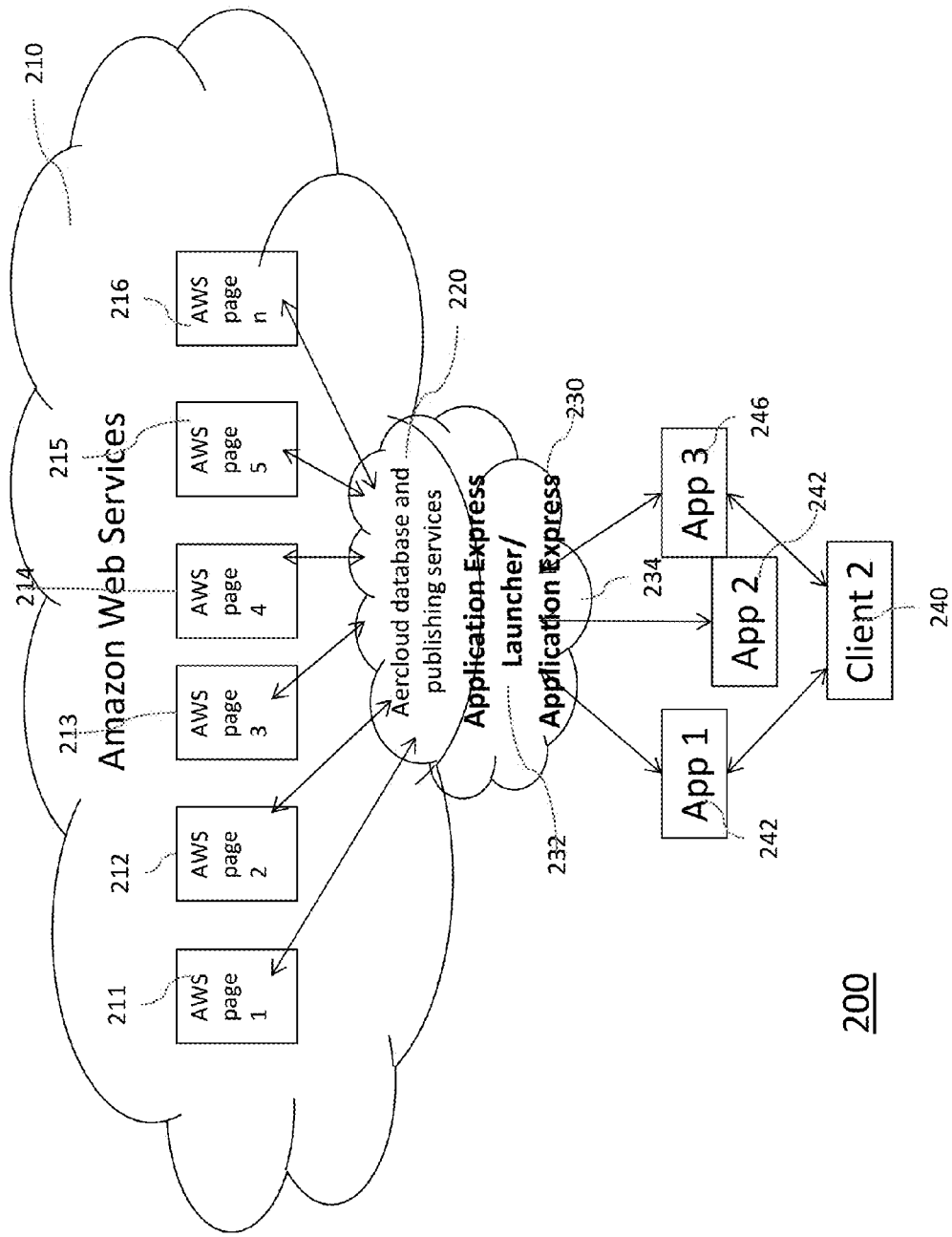
FIG. 2 illustrates a system with interaction between an enablement platform for creation of instances at a web-based hosted compute resource service and development of applications for analysis of data from M2M devices received and stored at a hosted data storage and management service according to an embodiment of the present invention.

FIG. 2 illustrates a system 200 with interaction between an enablement platform for development of web applications according to an embodiment of the present invention. As shown in FIG. 2, an enablement platform 230 containing Application Express Launcher 232 Application Express 234 interacts with the pages 211-n provided by the hosted web service 210 for creating instances for use of compute resources at the hosted service and for building and web applications App1 242, App2 244 and App3 246 to communicate information received from client2 240 as illustrated in the following figures.

Figure 3:
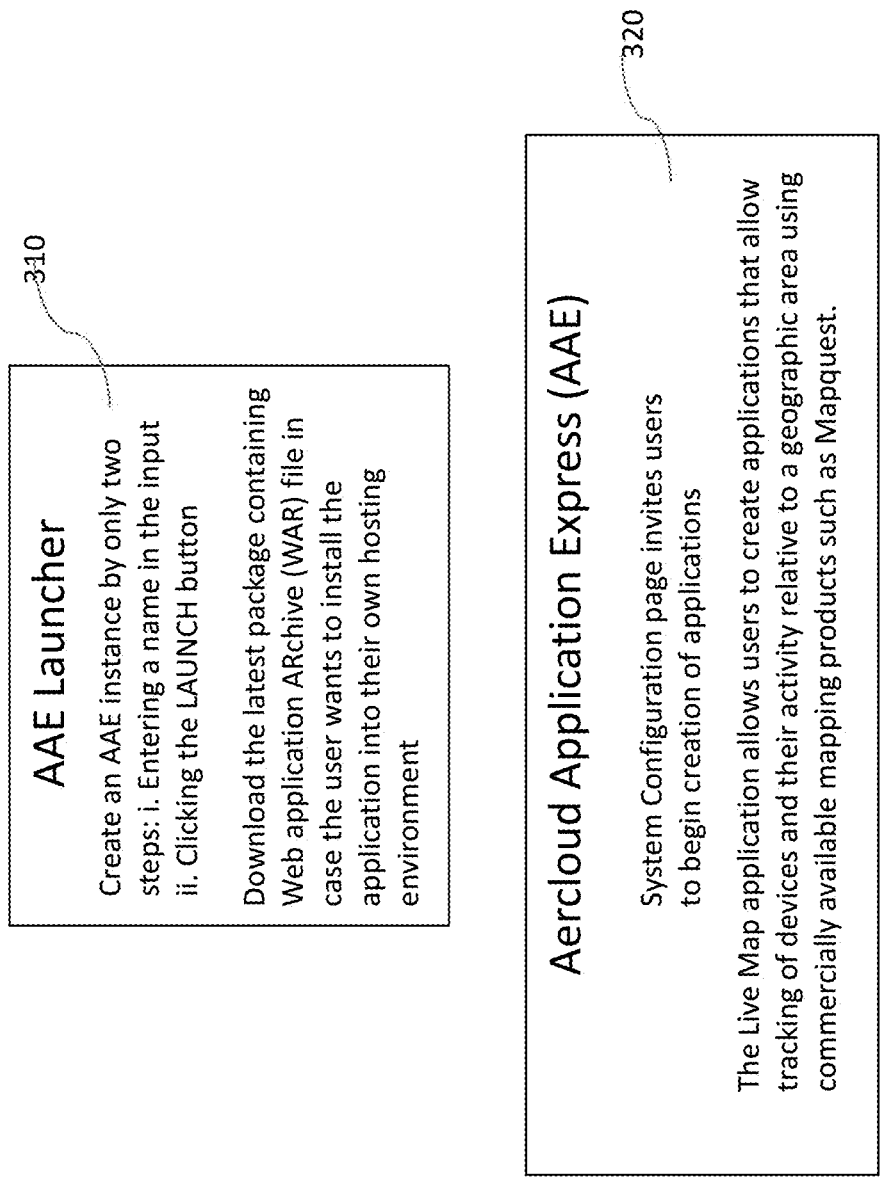
FIG. 3 is a diagram illustrating various steps involved in creating a new instance at hosted compute resource service and for development of applications for analysis of data from M2M devices using an enablement platform according to an embodiment of the present invention.

FIG. 3 is a diagram illustrating various steps involved in creating a new instance of compute resources for development of web applications using an enablement platform according to an embodiment of the present invention. In step 1 310, AerCloud Application Express Launcher helps create a new AAE instance by only two steps: i. entering a name in the input and ii. clicking the LAUNCH button. If the user wants to install the new application in its own hosting environment, rather than run the application on AerCloud, AAE Launcher allows the user to download the latest package containing Web application ARchive (WAR) file required for running the application. In step 2 320, AerCloud Application Express's System Configuration page invites users to begin creation of applications. The Live Map application allows users to create applications that allow tracking of devices and their activity relative to a geographic area using commercially available mapping products such as Mapquest. Both the steps 310 and 320 are achieved via easy to user interface with the help of various widgets as illustrated in the following figures.

Figure 4:
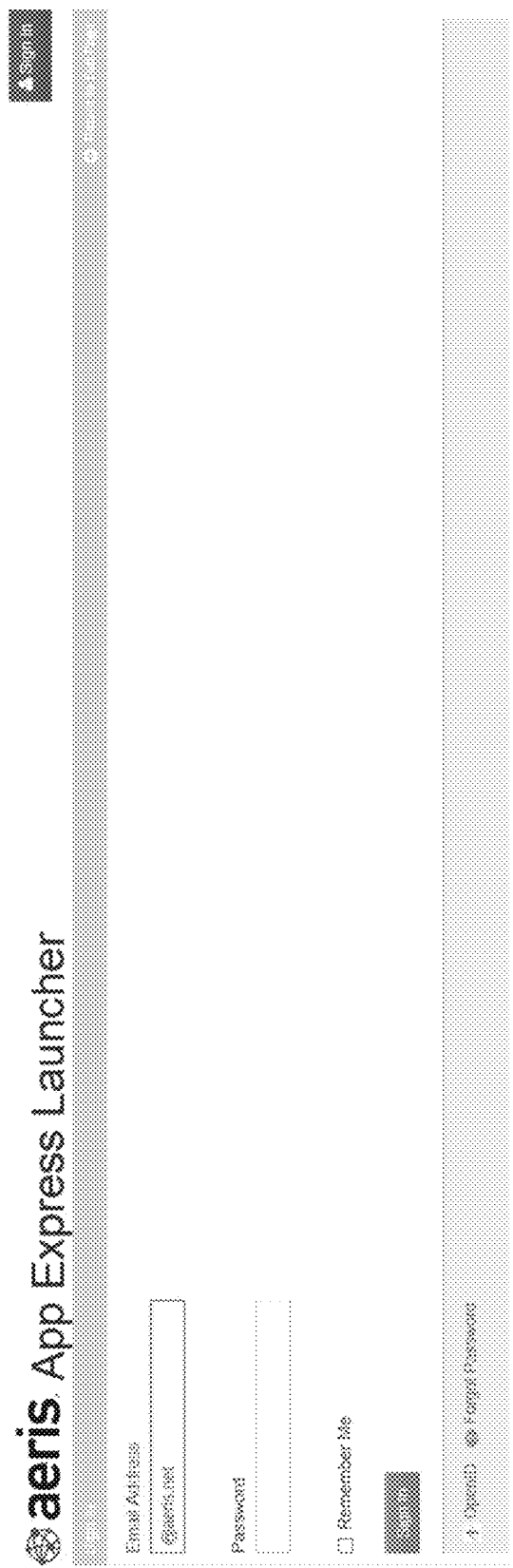
FIG. 4 is a diagram illustrating Application Express Launcher Sign In page for creating a new instance of hosted compute resources necessary for development of web-based applications for analysis of data from M2M devices using an enablement platform according to an embodiment of the present invention.

FIG. 4 is a diagram illustrating Application Express Launcher Sign In page for creating a new instance for development of web applications using an enablement platform according to an embodiment of the present invention. Once signed in, the user can access the information stored in the database, and access the functionalities such as: seeing all existing AAE instances associated with the account or by searching all existing AAE instances associated with the account, refresh search criteria with a new criteria for a search. See names of the AAE instances, see ID of newly created instances, see State of AAE instances, see System Status of newly created instances, see Instance Status of newly created instances, see if the existing AAE instances are ready to use, see Private and Public IP of the existing AAE instances, see URL of the AAE instances, select and launch selected AAE instance in a new browser window, reboot an existing AAE instance, terminate an existing AAE instance and launch a repository for the source code and checkout the project.

Figure 5A:
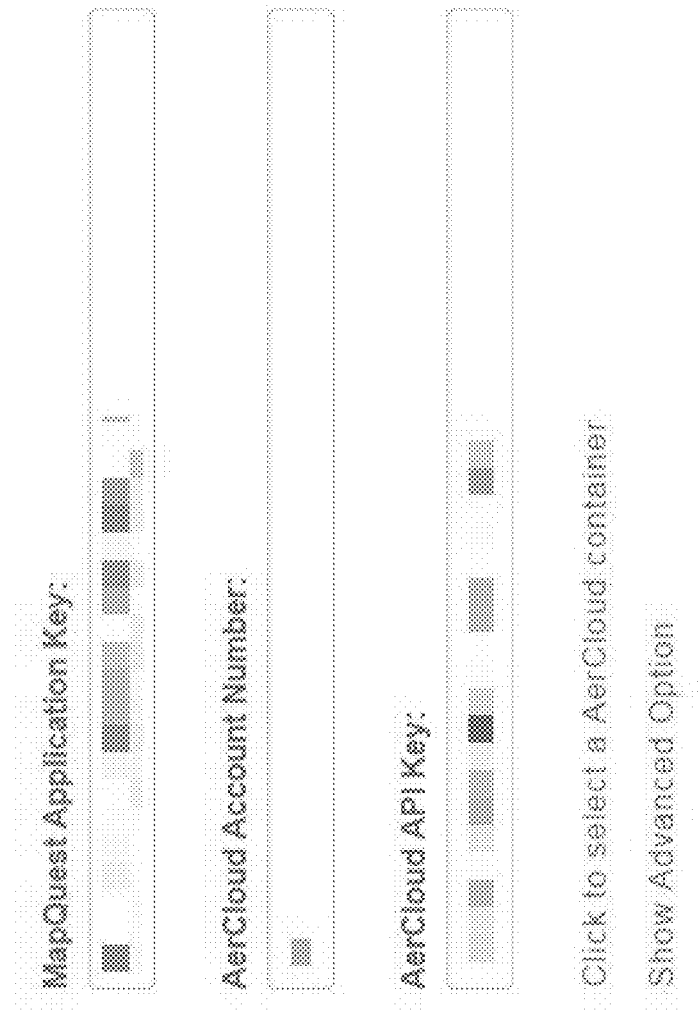
FIG. 5a is a diagram illustrating System Configuration page of Application Express inviting user to begin creation of application according to an embodiment of the present invention.

FIG. 5a is a diagram illustrating System Configuration page of Application Express inviting user to begin creation of an application according to an embodiment of the present invention. System Configuration page invites users to begin creation of applications, first by entering their user credentials for their AerCloud account such as account ID and API key and, if applicable, a key for incorporating MapQuest maps into applications that use a map. Upon entering a valid combination of the AerCloud credentials, the user specifies which data will be processed using the application under development. The user can select an existing container under the account. The user can also update the default AerCloud Web Service URL and default AerCloud Long Poll URL under the advanced option.

Figure 5B:
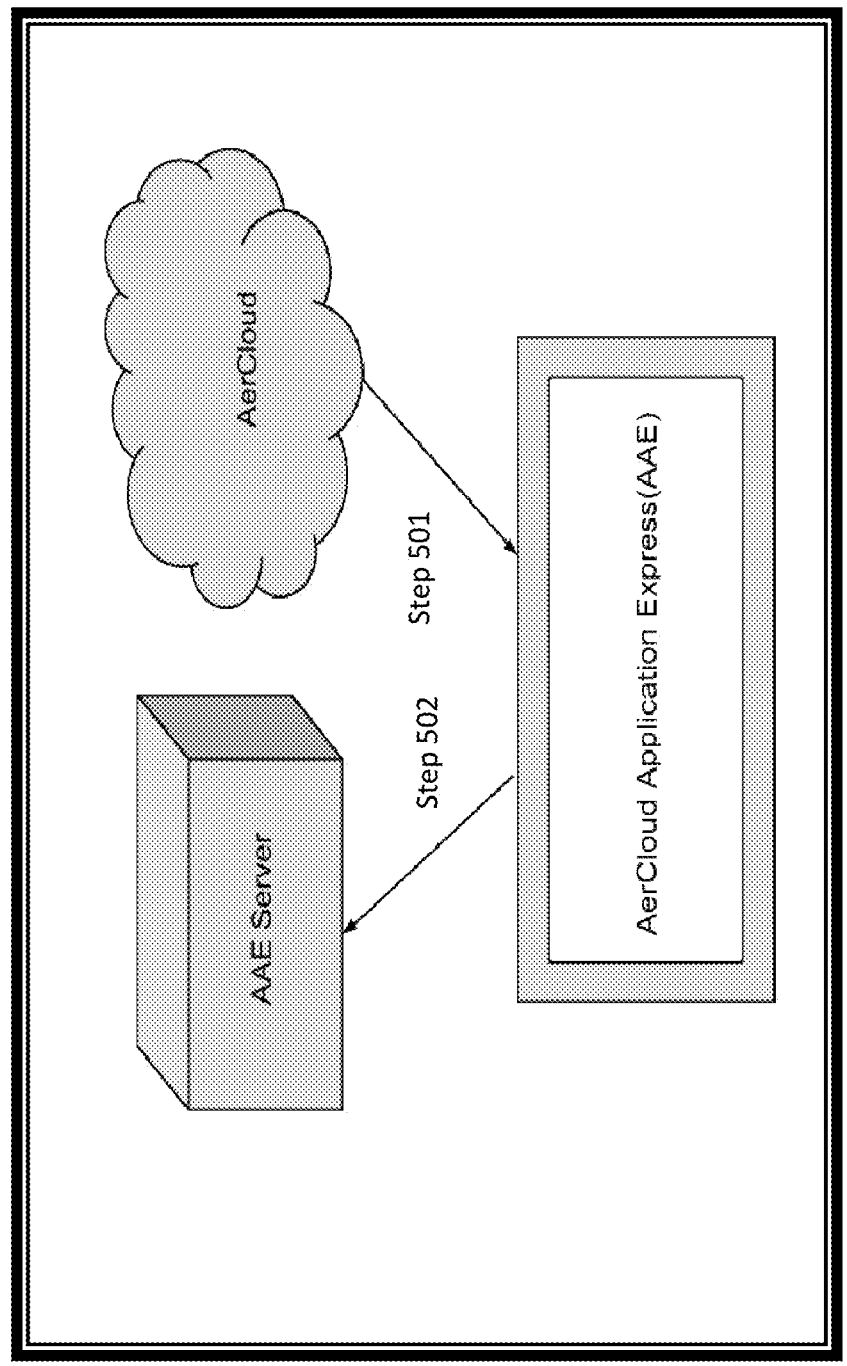
FIG. 5b is a diagram illustrating System Configuration application flow.

FIG. 5b is a diagram illustrating System Configuration application flow for development of an application using the Live Map application in an embodiment. A user first enters MapQuest maps into applications using a map and then enters Account ID and API Key. User then clicks the "Click to select an AerCloud container" link. Upon entering a valid combination of the AerCloud credentials, the user can select an existing container under its AerCloud account. The AAE interacts with AerCloud database to "get a list of AerCloud containers" associated with the user's AerCloud account via step 501 by providing account information, for example, {AerCloudWebServiceUrl}/v1/{accountId}/containers/}.
The user can also update the default AerCloud Web Service URL and default AerCloud Long Poll URL under the advanced option, wherein the AAE interacts with AerCloud database in the background to "POST a site configuration to AAE server", to save the information in the AerCloud database via step 502 by providing relevant information, for example, {LiferayBaseUrl}/{nameOfWarFile}/aae-server/site/{LiferayUserId}.

Figure 6A:
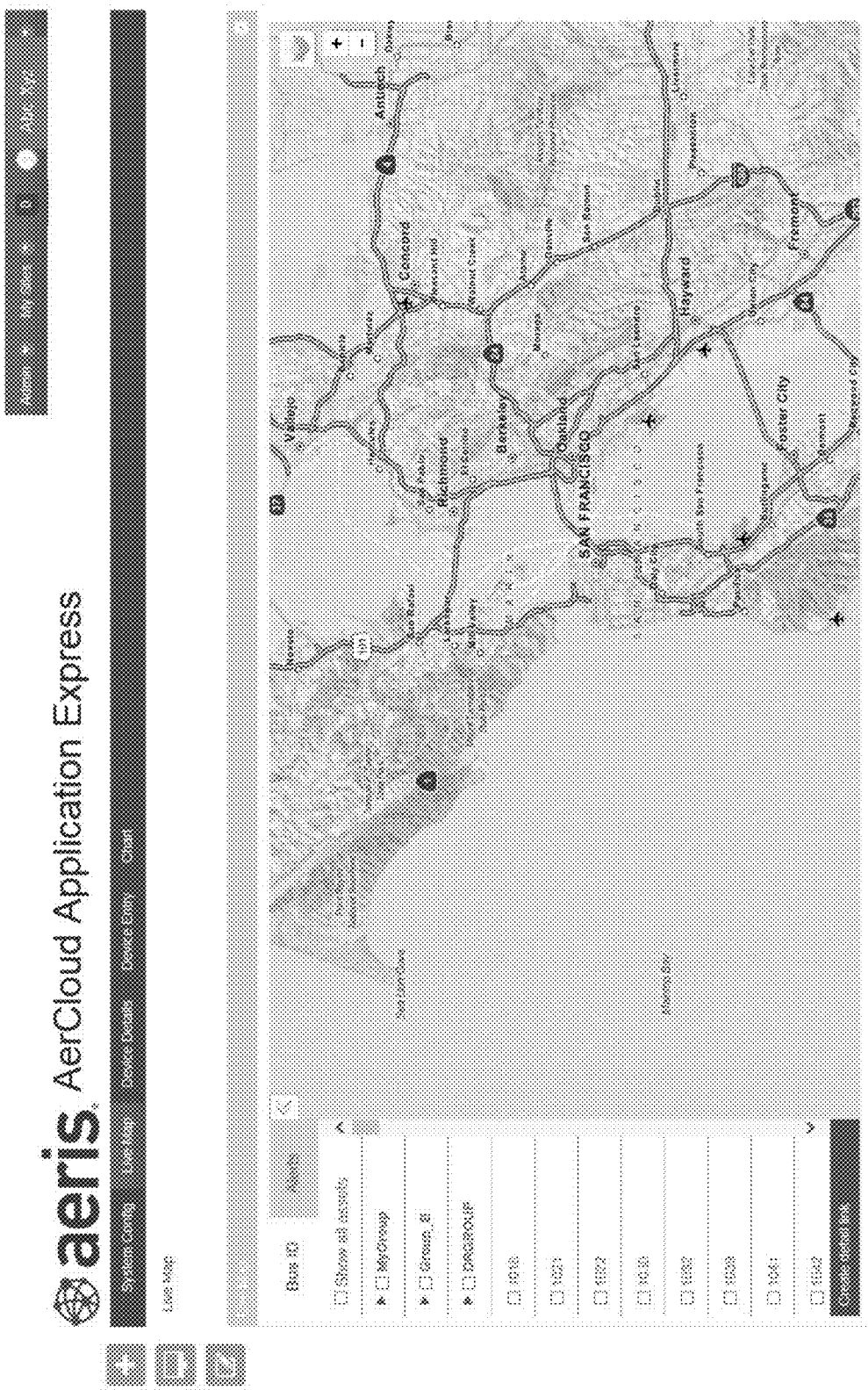
FIG. 6a is a diagram illustrating "Live Map", a widget provided by Application Express, allowing users to create applications for tracking of devices and their activity relative to a geographic area using commercially available mapping products such as Mapquest according to an embodiment of the present invention.

FIG. 6a is a diagram illustrating the Live Map application widget provided by ARE, which allows users to create applications for tracking of devices and their activity relative to a geographic area using commercially available mapping products such as Mapquest according to an embodiment of the present invention.

Figure 6B:
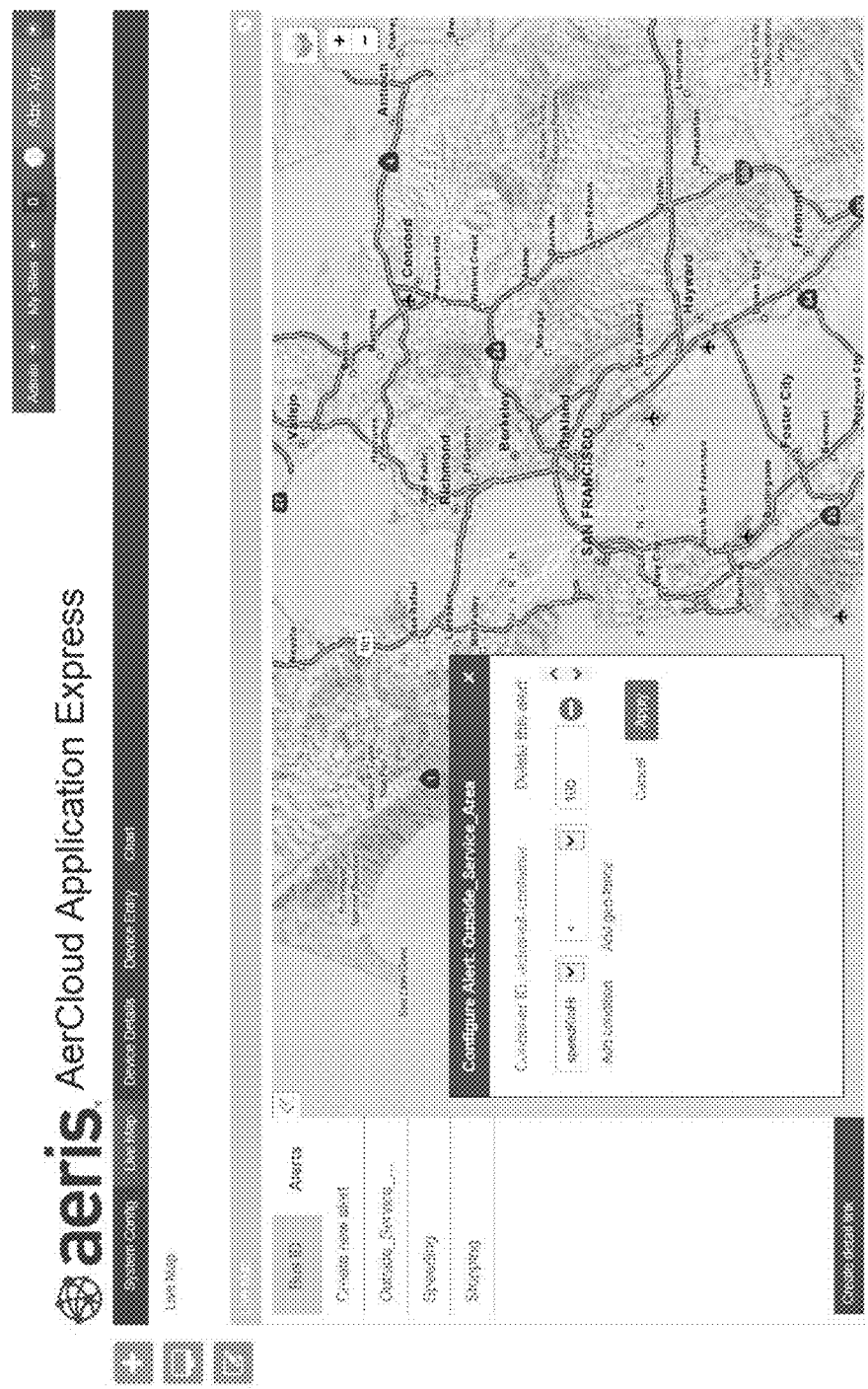
FIG. 6b is a diagram illustrating Live Map application widget provided by Application Express allowing users to configure alerts according to an embodiment of the present invention.

FIG. 6b is a diagram illustrating Live Map application widget provided by AAE allowing users to configure alerts according to an embodiment of the present invention. The Live Map application allows users to create applications that allow tracking of devices whose data has been sent to the selected container and their activity relative to a geographic area using commercially available mapping products such as Mapquest. The user can create "geofences" with respect to devices whose data has been sent to the selected container, which are alerts that send notifications when devices have, for example, entered a user-defined geographic area, left that area, or engaged in (or failed to engage in) certain behavior while located within that area. The invention simplifies the method provided by Mapquest for defining the boundaries of the geofence by using the drawing tool provided within the development tool and provides superior flexibility for setting alerts based on device behavior (such as which devices inside the geofence are behaving outside permitted parameters).

Steps to create and use this application include: In the left tab in the left panel, the user is permitted to: see all of their devices that have been associated with the application, see all of their groups that have been created using "Device Entry" and devices associated to the group, see all of their devices that are in alert status (see ii below for process for defining alerts), select all of their devices, groups of devices or individual device to display as a marker on the map. In the right tab in the left panel, the user is permitted to: create a new alert, see all the existing alerts, find the subscriptions associated with the selected container and see the detail of the alert in a draggable overlay widget.

The user is also permitted to create a link by clicking on the "Create detail link" in the bottom of the left panel. The section, for example, stays at the same position (bottom of the left panel) in the map. The clicking the link generate an overlay widget where the user is permitted to: enter and save the name of device detail page app, generate a link to the device detail page from the live map page when clicking the device ID in the left tab in the left panel, update the device detail page name, empty the device detail page name which removes a link to the device detail page from the device ID in the left tab in the left panel. Clicking the icon on the left panel next to the two tabs opens and closes the left panel. When the user checks "Show all assets", a group or individual device checkbox, the user is permitted to see the current location of the device on the map. When the user moves mouse over a marker on the map, the info of the marker shows up in a popup window above the marker. If the marker on the map is in the alert status, color of the marker is red. Likewise, if the marker on the map is not in the alert status, color of the marker is light green. If the marker is on the map and an existing alert with geo-fence is selected in the right tab in the left panel, the user is able to see if the marker is inside/outside of geo-fence on the map.

Figure 6C:
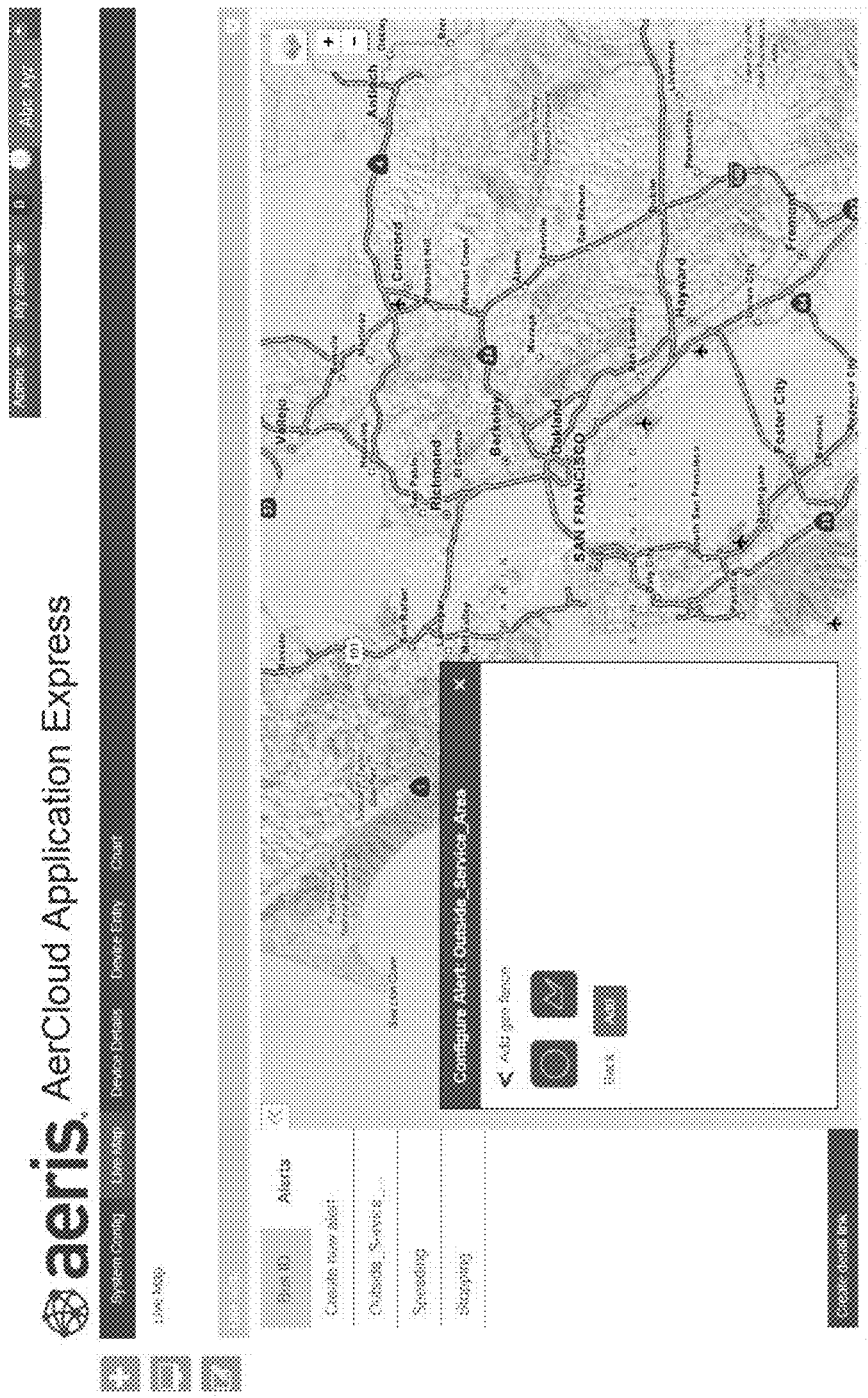
FIG. 6c is a diagram illustrating Live Map application widget provided by Application Express allowing users to configure alerts by adding "geofence" according to an embodiment of the present invention.

FIG. 6c is a diagram illustrating Live Map application widget provided by AAE allowing users to configure alerts by adding "geofence" according to an embodiment of the present invention. In the right tab in the left panel, the user is permitted to: create a new alert, see all the existing alerts, see the detail of the alert in a draggable overlay widget. In the draggable overlay widget, the user is permitted to: enter criteria for a new alert, update the selected alert, delete the selected alert, enter name of the alert, select a shape for geo-fence, click the Add button in the select a geo-fence shape view to enable geo-fence drawing mode using the simplified tool, see an instruction of what to do while in the geo-fence mode in a green popup. i.e. "Click and drag the mouse on the map to draw a circle", remove the geo-fence you have just drawn, set whether the alert should be executed when the device is inside of the geo-fence or outside of the geo-fence, set a condition with parameters retrieved from AerCloud, create an existing condition and/or delete an existing condition an inline navigation bar.

Figure 6D:
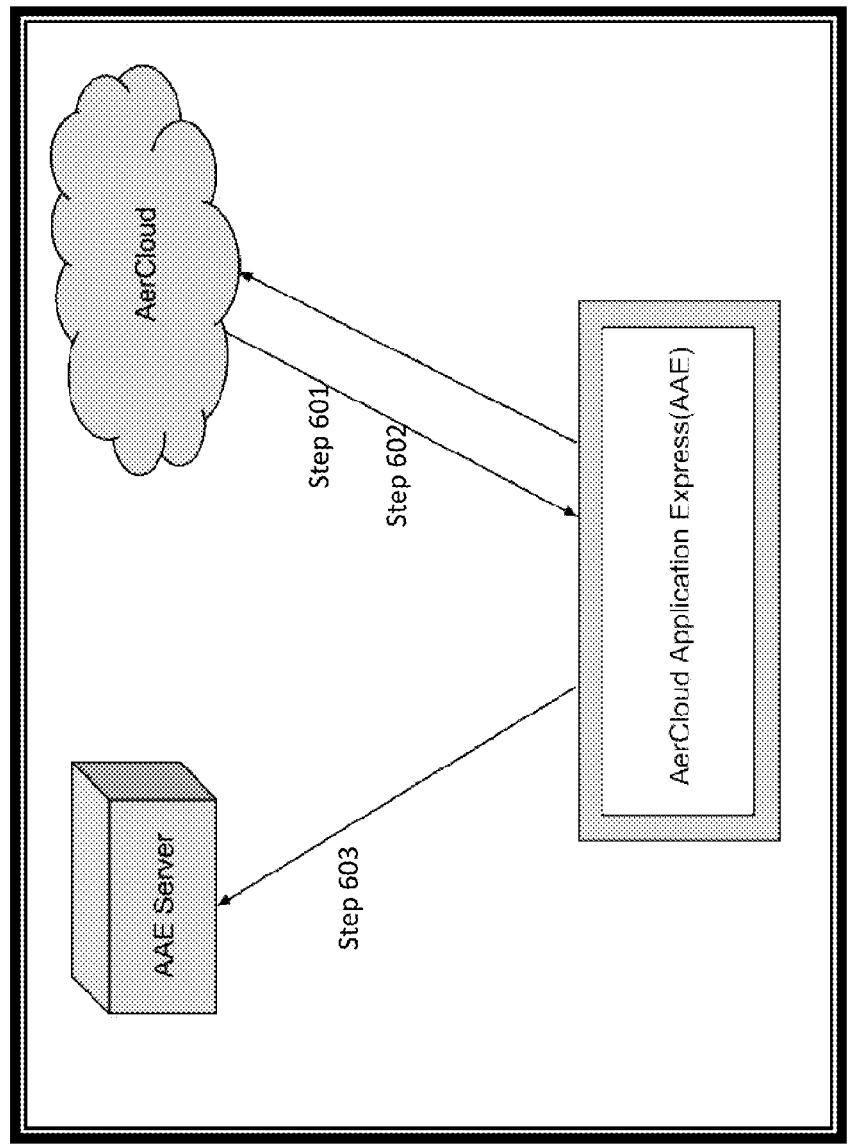
FIG. 6d is a diagram illustrating Live Map application flow.

FIG. 6d is a diagram illustrating Live Map application flow. As illustrated in FIG. 6d, the application express translates simple user commands to post or get the information either by interacting with AerCloud or AAE server. For example, as shown in FIG. 6a, the asset list tab in the left panel allows users to see all of their devices under the selected container that have been associated with the application. When the user clicks on "GET a list of devices that have linked to a container" the AAE translates the user command to retrieve data from the proper container, for example, "{AerCloudWebServiceUrl}/v1/{accountId}/containers/{containerId}/linkedScls}" via step 601. When the user clicks on "GET a device detail and check if the device is associated to a group", the AAE translates the user command to read data contained in the proper container, for example, "{AerCloudWebServiceUrl}/v1/{accountId}/scls/{sclId}" via step 602. Similarly, when the user clicks on the "Create Detail" link shown in FIG. 6, the AAE generates an overlay widget where the user can save the name of the Device Detail page app. The AAE achieves this by posting a site configuration to AAE server, for example, "{LiferayBaseUrl}/{nameOfWarfile}/aae-server/site/{LiferayUserId}" via step 603. This simplifies the user interaction with the database by providing easy to use application widgets.

Figure 7A:
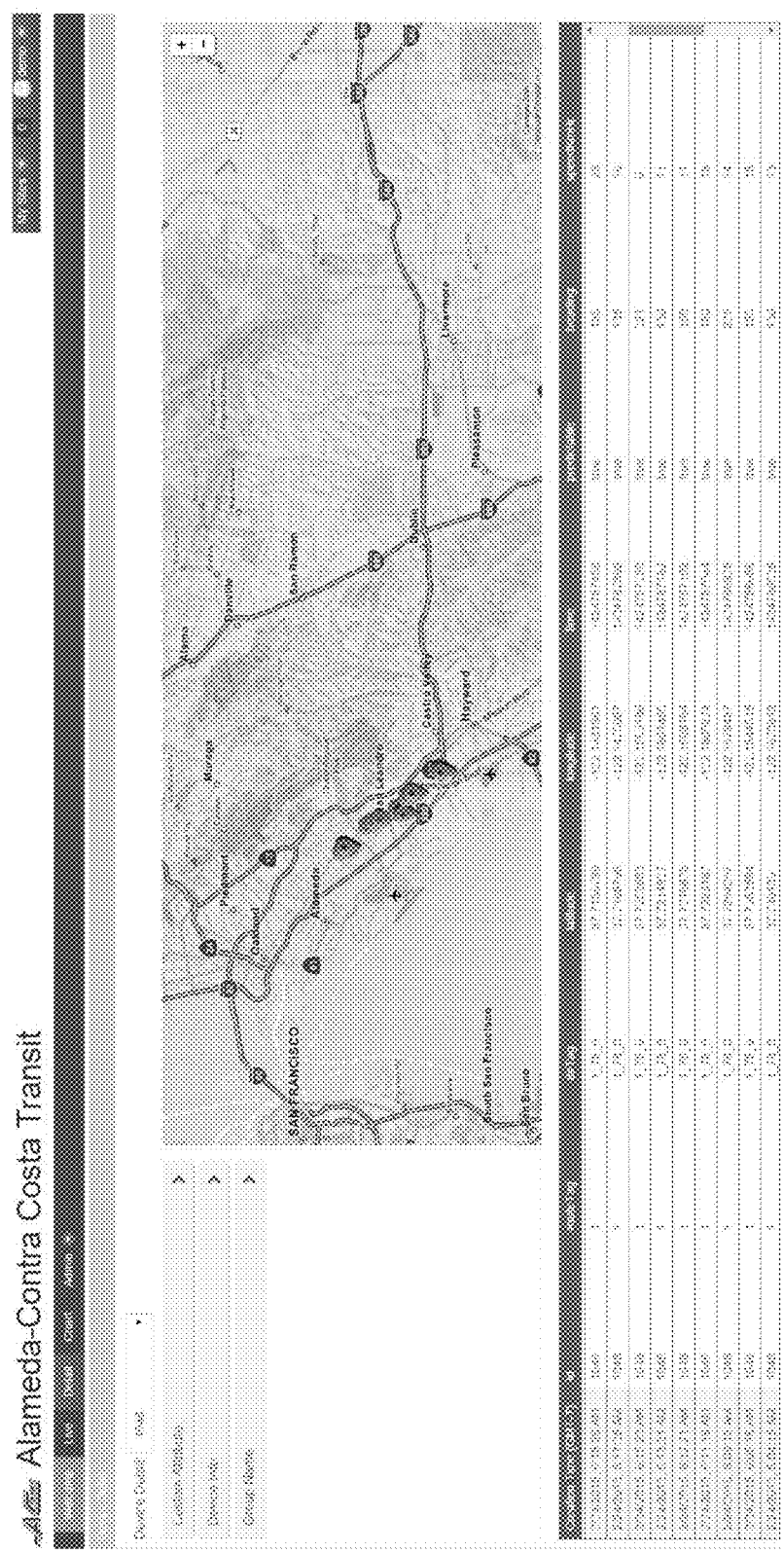
FIG. 7a is a diagram illustrating types of location data returned by the Live Map application widget provided by Application Express according to an embodiment of the present invention.
Figure 7B:
FIG. 7b is a diagram illustrating types of detailed data for M2M devices that can be entered into the Device Details application widget provided by Application Express according to an embodiment of the present invention.

FIGS. 7a and 7b illustrate Device Details application widget provided by AAE according to an embodiment of the present invention. By using the Device Detail application widget, when the user selects a device from the dropdown at the top, s/he can view the custom device attribute, device info and a group in the accordion in the top left section. The user can also see history of the locations for the selected device in the top right section. If the user moves mouse over the marker on the map, the user can see the info of the device. The user can also see history of the raw data for the selected device in a time series data table in the bottom section. The first column of the table, for example, is creation time and sorted by the most recent data sent from the device. If the user has saved the detail page name using "Create detail link" in the Live Map application widget, the user can launch the Device Detail app from the Live Map app and the device in the dropdown is pre-selected in the Device Detail page. When the user moves the mouse over on a marker on map or device, the user can view the details of the device.

Figure 7C:
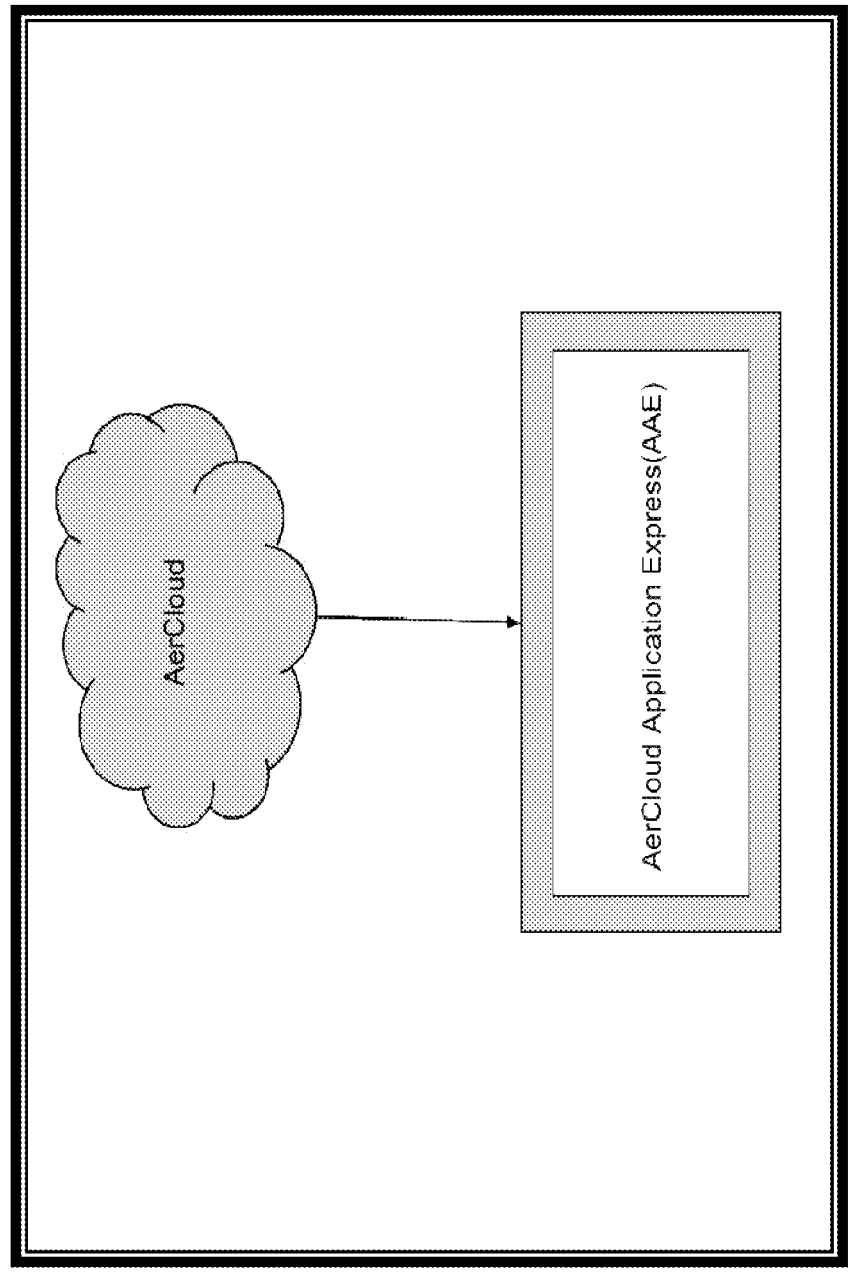
FIG. 7c is a diagram illustrating Device Detail Application Call Flow.

FIG. 7c is a diagram illustrating Device Detail Application Call Flow. When the user selects a device from the dropdown at the top of the page, s/he can view the custom device attributes. To achieve this, the AAE interacts with AerCloud database in the background to execute certain commands, for example, "GET a list of custom attributes for the selected device" by providing information to the database such as "{AerCloudWebServiceUrl}/v1/{accountId}/scls/{sclId}/mgmtObjs/customAttributes}" to retrieve the desired information.

Figure 8A:
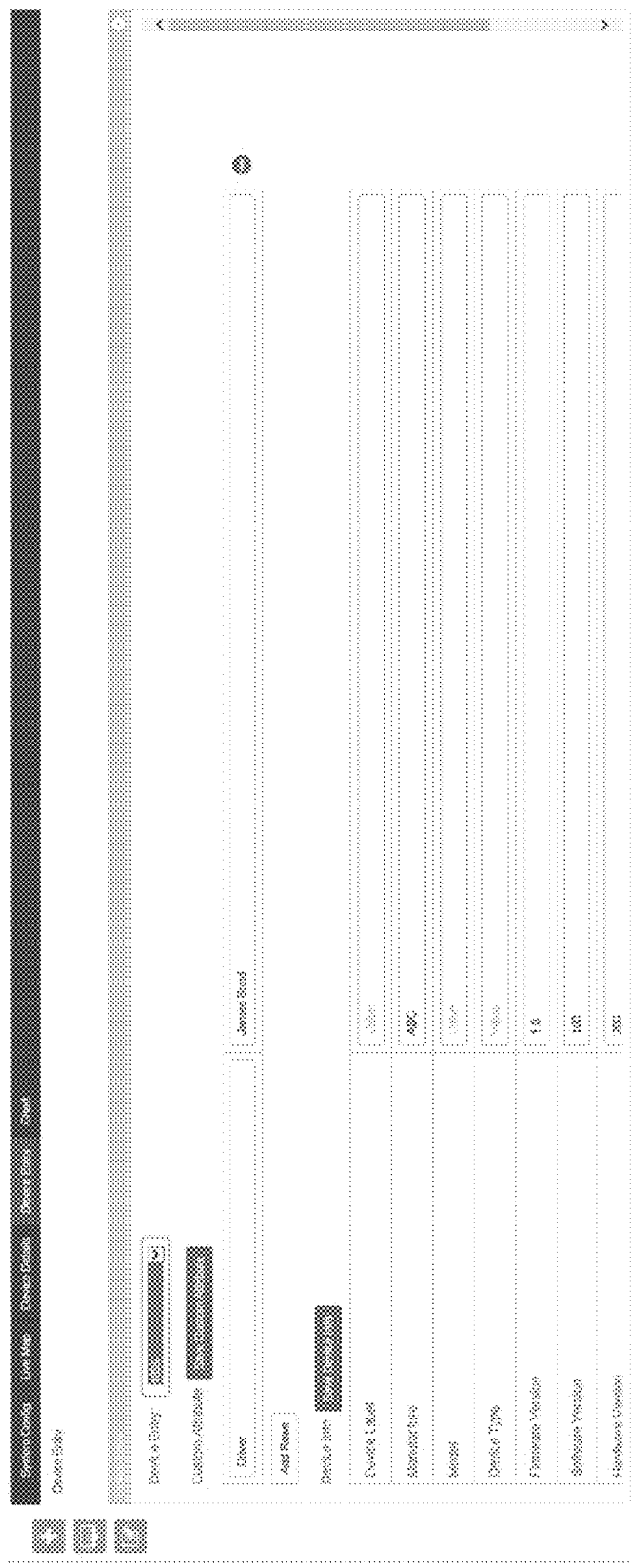
FIG. 8a is a diagram illustrating Device Entry application widget provided by Application Express.

FIG. 8a is a diagram illustrating Device Entry application widget provided by AAE. The Device Entry application widget allows the user to select a device from the drop down menu. When the user selects a device from the dropdown, the user is permitted to: see all the existing custom device attribute and device info, create a new custom device attribute and device info an inline navigation bar, update the existing custom device attribute and device info, delete a new custom device attribute and device info an inline navigation bar, create a new group by clicking the Create new group link which generates an overlay widget, associate a group for the selected device by selecting a group from the dropdown in the group section, disassociate a group from the selected device by selecting "--Select Group--" from the dropdown in the group section and delete an existing group by the Delete [group name] link.

Figure 8B:
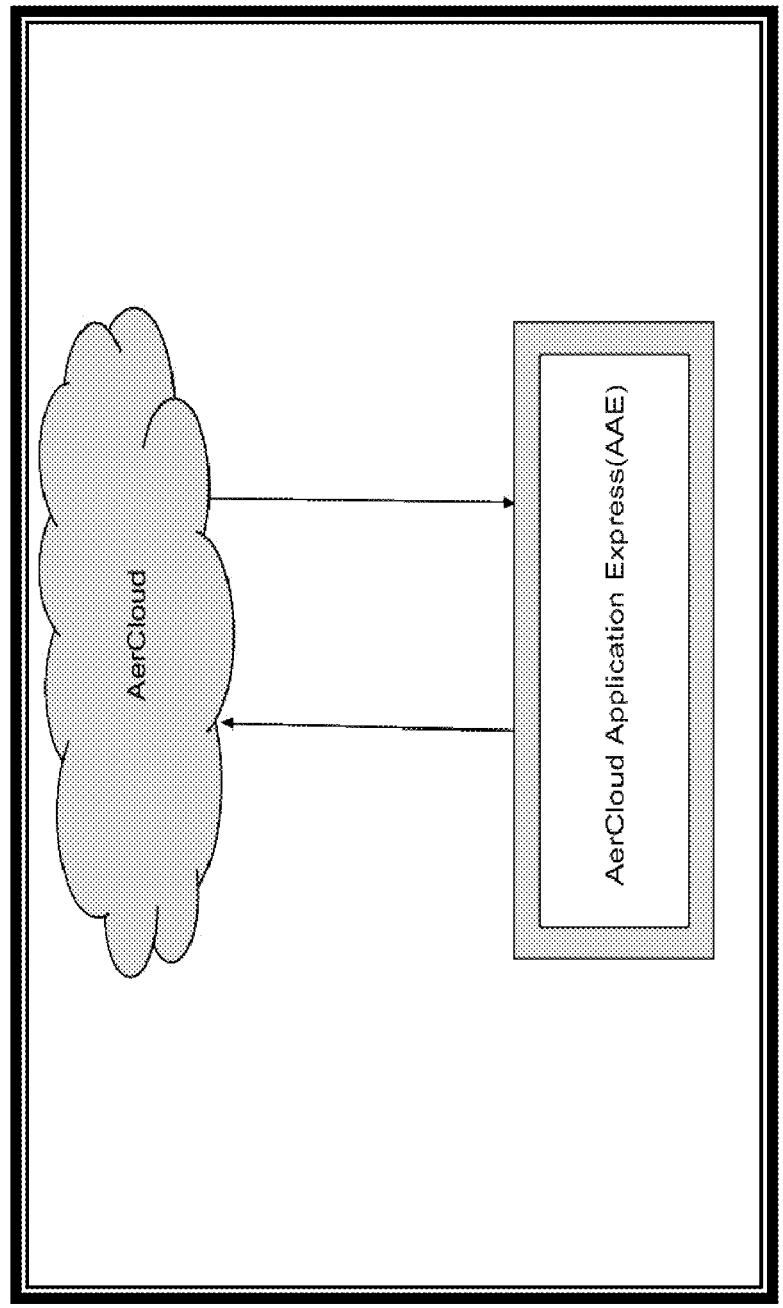
FIG. 8b is a diagram illustrating Device Entry Application Call Flow.

FIG. 8b is a diagram illustrating Device Entry Application Call Flow. As the user uses different functionalities provided by the Device Entry application widget, the AAE interacts with AerCloud database in the background to execute certain commands, for example, when the user wants to view all the existing custom device attributes, AAE interacts with AerCloud database via step 701 to "GET a list of custom attributes for the selected device" from the database, for example, "{AerCloudWebServiceUrl}/v1/{accountId}/scls/{sclId}/mgmtObjs/customAttributes}".

Figure 9A:
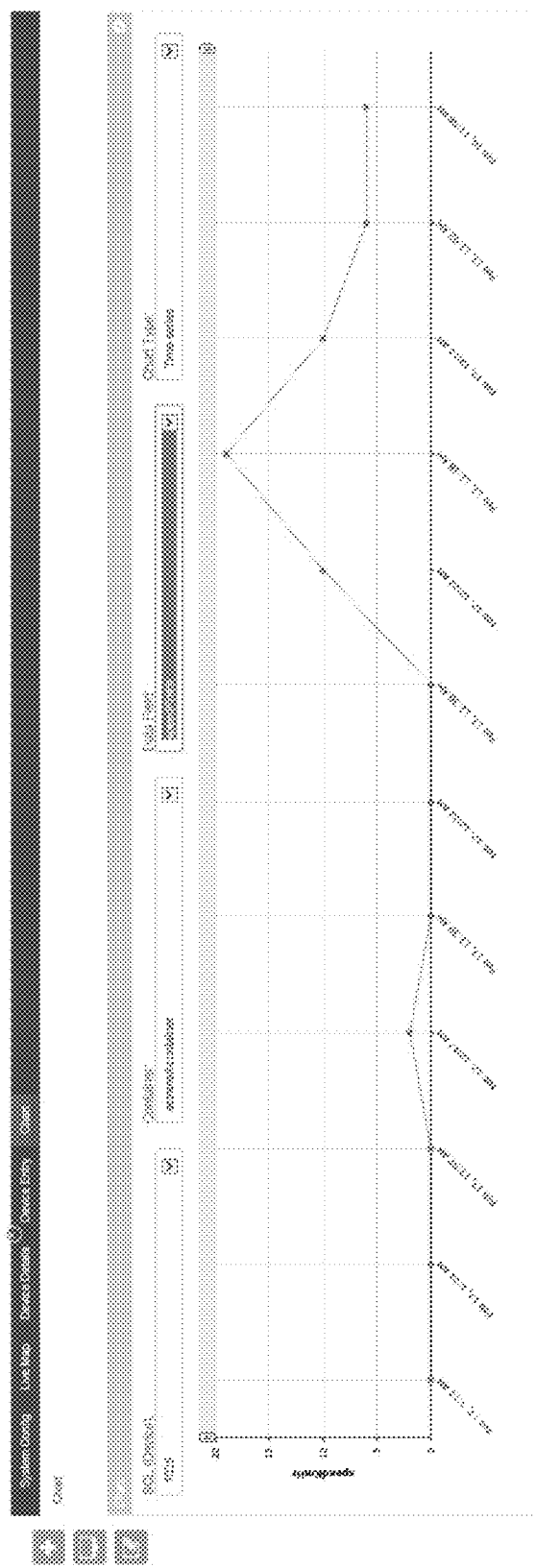
FIG. 9a is a diagram illustrating Device Entry application widget provided by Application Express according to an embodiment of the present invention.

FIG. 9a is a diagram illustrating Chart application widgets according to an embodiment of the present invention. The user can generate a time-series chart by selecting device, data field and chart type using the chart application widget.

Figure 9B:
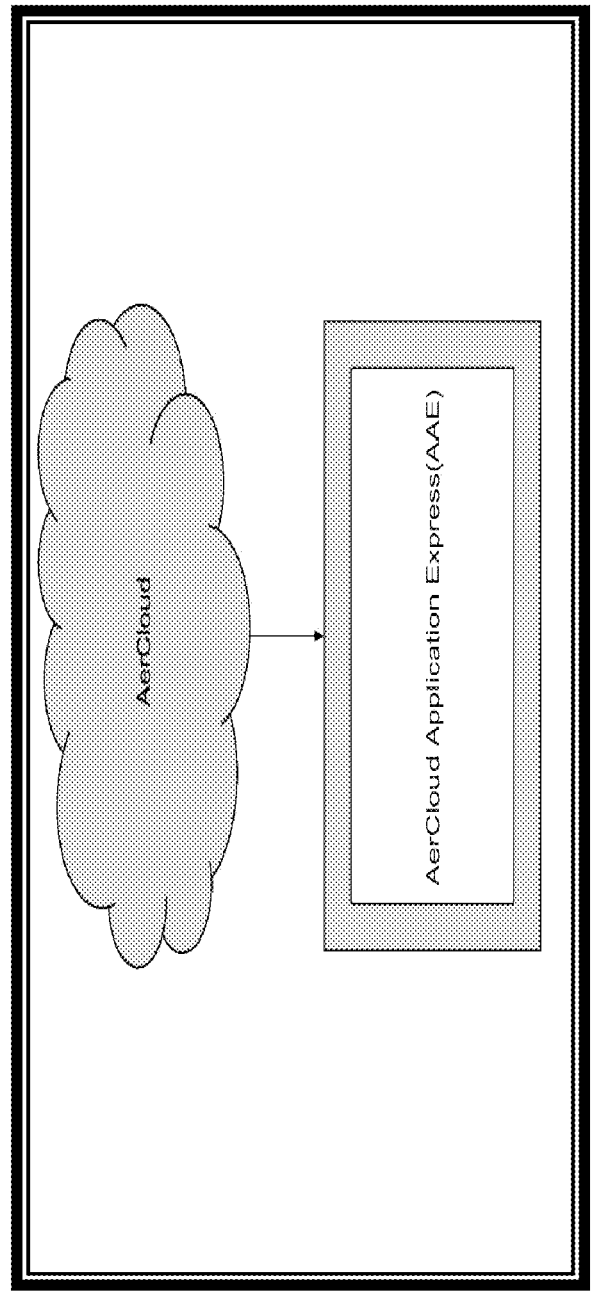
FIG. 9b is a diagram illustrating Chart Application Call Flow.

FIG. 9b is a diagram illustrating Chart Application Call Flow.

Figure 10:
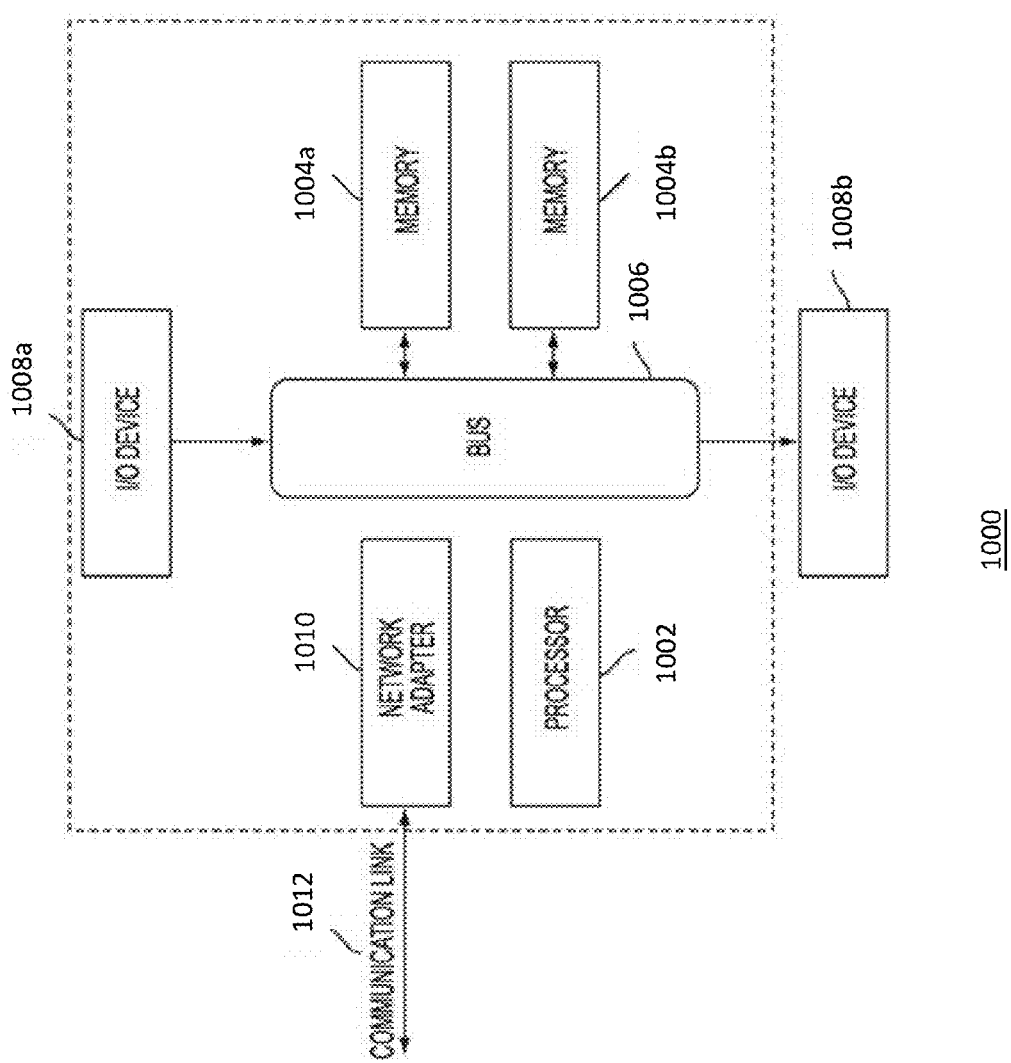
FIG. 10 illustrates a data processing system 1000 suitable for storing the computer program product and/or executing program code relating to the choices of the users in accordance with an embodiment of the present invention.

FIG. 10 illustrates a data processing system 1000, such as an M2M device, suitable for storing the computer program product and/or executing program code in accordance with an embodiment of the present invention. The data processing system 1000 includes a processor 1002 coupled to memory elements 1004a-b through a system bus 1006. In other embodiments, the data processing system 1000 may include more than one processor and each processor may be coupled directly or indirectly to one or more memory elements through a system bus.

Memory elements 1004a-b can include local memory employed during actual execution of the program code, bulk storage, and cache memories that provide temporary storage of at least some program code in order to reduce the number of times the code must be retrieved from bulk storage during execution. As shown, input/output or I/O devices 1008a-b (including, but not limited to, keyboards, displays, pointing devices, etc.) are coupled to the data processing system 1000. I/O devices 1008a-b may be coupled to the data processing system 1000 directly or indirectly through intervening I/O controllers (not shown).

In FIG. 10, a network adapter 1010 is coupled to the data processing system 1002 to enable data processing system 1002 to become coupled to other data processing systems or remote printers or storage devices through communication link 1012. Communication link 1012 can be a private or public network. Modems, cable modems, and Ethernet cards are just a few of the currently available types of network adapters.

Embodiments described herein can take the form of an entirely hardware implementation, an entirely software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include digital versatile disk (DVD), compact disk-read-only memory (CD-ROM), and compact disk-read/write (CD-R/W).

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow.

As used herein the terms product, device, appliance, terminal, remote device, wireless asset, etc. are intended to be inclusive, interchangeable, and/or synonymous with one another and other similar communication-based equipment for purposes of the present invention though one will recognize that functionally each may have unique characteristics, functions and/or operations which may be specific to its individual capabilities and/or deployment.

As used herein the term M2M communication is understood to include methods of utilizing various connected computing devices, servers, clusters of servers, wired and/or wirelessly, which provide a networked infrastructure to deliver computing, processing and storage capacity as services where a user typically accesses applications through a connected means such as but not limited to a web browser, terminal, mobile application or similar while the primary software and data are stored on servers or locations apart from the devices.

Similarly, it is envisioned by the present invention that the term communications network includes communications across a network (such as that of a M2M but not limited thereto) using one or more communication architectures, methods, and networks, including but not limited to: Code Division Multiple Access (CDMA), Global System for Mobile Communications (GSM) ("GSM" is a trademark of the GSM Association), Universal Mobile Telecommunications System (UMTS), Long Term Evolution (LTE), fourth generation cellular systems (4G) LTE, wireless local area network (WLAN), and one or more wired networks.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

What is claimed is:

1. A method, comprising:
    receiving, by an application controller executing on one or more first virtual machines of a cloud computing platform and from a development environment executing on a client device, a web application, the web application being compatible with a runtime environment available from the cloud computing platform;
    submitting, by the application controller and to a service provider executing on one or more second virtual machines of the cloud computing platform, a request for available services of the cloud computing platform, wherein the service provider includes a plurality of application components;
    receiving, by the application controller from one or more application components of the service provider, application data for one or more available services of the cloud computing platform;
    receiving, by the application controller from the development environment executing on the client device, a user selection of a particular available service of the one or more available services of the cloud computing platform by collecting required information and feeding it to one or more fields in at least one hosted services page in the background, and returning confirmation of creation of an instance, without requiring the user to leave the at least one hosted services page;
    binding, by the application controller, the selected available service to the web application, including editing the web application to insert at least a portion of the received application data for the selected available service into the web application; and
    packaging, by the application controller, the edited web application into a web application deployment package.

2. The method of claim 1, wherein a Machine to Machine (M2M) application is communicatively coupled to a plurality of M2M devices through an M2M network.

3. The method of claim 2, wherein the M2M network includes at least one of wired communications and wireless communications.

4. The method of claim 3, wherein the wireless communications include at least one of WiFi communications and cellular communications.

5. The method of claim 2, wherein each M2M device includes a processor having limited logic, a memory, a communications adapter in communication with the M2M network and a sensor.

6. The method of claim 2, wherein the M2M application receives real-time data from the plurality of M2M devices through the M2M network.

7. The method of claim 1, wherein the web application includes an M2M application.

8. A system, comprising:
    a cloud server having a hardware processor communicatively coupled with one or more first virtual machines of a cloud computing platform and configured to receive a request to instantiate a new instance of a Machine to Machine (M2M) application, the M2M application being compatible with a runtime environment available from the cloud computing platform,
    wherein the cloud computing platform is configured to submit to a service provider executing on one or more second virtual machines of the cloud computing platform, a request for available services of the cloud computing platform, wherein the service provider includes a plurality of application components;
    wherein the cloud computing platform is further configured to receive, from the service provider, M2M application data for one or more available services of the cloud computing platform;
    wherein the cloud computing platform is further configured to receive from a development environment, a user selection of a particular available service of the one or more available services of the cloud computing platform by collecting required information and feeding it to one or more fields in at least one hosted services pages to create the new instance of the M2M application in the background, and returning confirmation of creation of the new instance, without requiring the a user to leave the at least one hosted services page;

wherein the cloud computing platform is further configured to hind the selected available service to the M2M application, including editing the M2M application to insert at least a portion of the received M2M application data for the selected available service, into the application; and one or more virtual machines, communicatively coupled to the cloud computing platform, each instantiating the new instance of the M2M application.

9. The system of claim 8, wherein the M2M application is communicatively coupled to a plurality of M2M devices through an M2M network.

10. The system of claim 9, wherein the M2M network includes at least one of wired communications and wireless communications.

11. The system of claim 9, wherein each M2M device includes a processor having limited logic, a memory, a communications adapter in communication with the M2M network and a sensor.

12. The system of claim 9, wherein the M2M application receives real-time data from the plurality of M2M devices through the M2M network.

13. The system of claim 12, where at least one M2M device from among the plurality of M2M devices includes sufficient onboard application logic to process real-time data and determine whether certain parameters triggering an action have been met.

14. The system of claim 13, wherein the triggering action includes forwarding the real-time data to the M2M application.

15. A computer program product embodied on a non-transitory computer readable medium, comprising computer code which when executed by a computer causes the computer to perform a method comprising:

receiving by one or more first virtual machines of a cloud computing platform and from a development environment executing on a client device a Machine to Machine (M2M) application, the M2M application being compatible with a runtime environment available from a cloud computing platform;

submitting, to a service provide executing one or more second virtual machines of the cloud computing platform, a request for available services of the cloud computing platform, wherein the service provider includes a plurality of M2M application components;

receiving by the cloud computing platform, from the service provider, M2M application data for one or more available services of the cloud computing platform;

receiving, from the development environment, a user selection of a particular available service of the one or more available services of the cloud computing platform by collecting required information and feeding it to one or more fields in at least one hosted services pages in the background, and returning confirmation of creation of an instance, without requiring the user to leave the at least one hosted services page;

binding the selected available service to the M2M application, including editing the M2M application to insert at least a portion of the received M2M application data for the selected available service into the M2M application; and packaging the edited M2M application into a M2M application deployment package.

16. The computer-readable medium of claim 15, wherein the M2M application is communicatively coupled to a plurality of M2M devices through an M2M network.

17. The computer-readable medium of claim 16, wherein the M2M network includes at least one of wired communications and wireless communications.

18. The computer-readable medium of claim 17, wherein the wireless communications include at least one of WiFi communications and cellular communications.

19. The computer-readable medium of claim 16, wherein each M2M device includes a processor having limited logic, a memory, a communications adapter in communication with the M2M network and a sensor.

20. The computer-readable medium of claim 15, wherein the M2M application includes a web application.

\* \* \* \* \*